United States Patent
Kimura et al.

(10) Patent No.: US 12,393,296 B2
(45) Date of Patent: Aug. 19, 2025

(54) INPUT/OUTPUT PANEL AND INPUT/OUTPUT DEVICE

(71) Applicant: SEMICONDUCTOR ENERGY LABORATORY CO., LTD., Atsugi (JP)

(72) Inventors: Hajime Kimura, Kanagawa (JP); Shunpei Yamazaki, Tokyo (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 0 days.

(21) Appl. No.: 18/786,732

(22) Filed: Jul. 29, 2024

(65) Prior Publication Data

US 2024/0385709 A1   Nov. 21, 2024

Related U.S. Application Data

(63) Continuation of application No. 17/236,185, filed on Apr. 21, 2021, which is a continuation of application (Continued)

(30) Foreign Application Priority Data

Mar. 11, 2016  (JP) ................................ 2016-047788

(51) Int. Cl.
*G06F 3/041* (2006.01)
*G02F 1/1333* (2006.01)
(Continued)

(52) U.S. Cl.
CPC ...... *G06F 3/0412* (2013.01); *G02F 1/133345* (2013.01); *G02F 1/13338* (2013.01); (Continued)

(58) Field of Classification Search
CPC .......... G02F 1/133345; G02F 1/13338; G02F 1/134336; G02F 1/136286; G02F 1/1368; (Continued)

(56) References Cited

U.S. PATENT DOCUMENTS 7,674,650 B2   3/2010  Akimoto et al.
7,732,819 B2   6/2010  Akimoto et al.
(Continued)

FOREIGN PATENT DOCUMENTS

EP   2214084 A   8/2010
EP   3557390 A   10/2019
(Continued)

*Primary Examiner* — Insa Sadio
(74) *Attorney, Agent, or Firm* — Fish & Richardson P.C.

(57) ABSTRACT

To provide a novel input/output panel that is highly convenient or reliable, a novel input/output device that is highly convenient or reliable, a novel input/output panel, a novel input/output device, or a novel semiconductor device. The input/output panel includes a pixel, a sensor element, a signal line, a control line, and a scan line. The sensor element has a region overlapping with the pixel. The signal line is electrically connected to the sensor element and the pixel. The control line is electrically connected to the sensor element. The scan line is electrically connected to the pixel.

10 Claims, 20 Drawing Sheets

Related U.S. Application Data

No. 15/450,174, filed on Mar. 6, 2017, now abandoned.

(51) Int. Cl.
  *G02F 1/1343*   (2006.01)
  *G02F 1/1362*   (2006.01)
  *G02F 1/1368*   (2006.01)
  *G06F 3/044*    (2006.01)

(52) U.S. Cl.
  CPC .. *G02F 1/134336* (2013.01); *G02F 1/136286* (2013.01); *G02F 1/1368* (2013.01); *G06F 3/04166* (2019.05); *G06F 3/0445* (2019.05); *G06F 3/0446* (2019.05); *G06F 3/04164* (2019.05)

(58) Field of Classification Search
  CPC .............. G06F 3/0412; G06F 3/04164; G06F 3/04166; G06F 3/0445; G06F 3/0446
  See application file for complete search history.

(56) References Cited

U.S. PATENT DOCUMENTS

| | | | |
|---|---|---|---|
| 7,859,521 B2 | 12/2010 | Hotelling et al. | |
| 7,910,490 B2 | 3/2011 | Akimoto et al. | |
| 7,920,129 B2 | 4/2011 | Hotelling et al. | |
| 7,932,521 B2 | 4/2011 | Akimoto et al. | |
| 7,995,041 B2 | 8/2011 | Chang | |
| 8,217,913 B2 | 7/2012 | Hotelling et al. | |
| 8,274,077 B2 | 9/2012 | Akimoto et al. | |
| 8,363,027 B2 | 1/2013 | Hotelling et al. | |
| 8,466,463 B2 | 6/2013 | Akimoto et al. | |
| 8,502,799 B2 | 8/2013 | Hotelling et al. | |
| 8,629,069 B2 | 1/2014 | Akimoto et al. | |
| 8,643,796 B2 | 2/2014 | Kimura et al. | |
| 8,669,550 B2 | 3/2014 | Akimoto et al. | |
| 8,786,557 B2 | 7/2014 | Noguchi et al. | |
| 8,790,959 B2 | 7/2014 | Akimoto et al. | |
| 8,796,069 B2 | 8/2014 | Akimoto et al. | |
| 9,099,562 B2 | 8/2015 | Akimoto et al. | |
| 9,134,560 B2 | 9/2015 | Hotelling et al. | |
| 9,495,031 B2 | 11/2016 | Omoto | |
| 9,760,200 B2 | 9/2017 | Hotelling et al. | |
| 2006/0017710 A1* | 1/2006 | Lee | G06F 3/0447 345/173 |
| 2006/0238135 A1 | 10/2006 | Kimura | |
| 2009/0303163 A1 | 12/2009 | Kohno et al. | |
| 2010/0300862 A1 | 12/2010 | Tamura. et al. | |
| 2013/0141320 A1* | 6/2013 | Kim | G09G 3/3685 345/92 |
| 2013/0222322 A1 | 8/2013 | Drew | |
| 2013/0300953 A1 | 11/2013 | Hotelling et al. | |
| 2014/0055412 A1 | 2/2014 | Teramoto | |
| 2014/0063368 A1 | 3/2014 | Yamazaki et al. | |
| 2014/0267159 A1 | 9/2014 | Miyazaki et al. | |
| 2015/0070611 A1 | 3/2015 | Shima et al. | |
| 2015/0255518 A1 | 9/2015 | Watanabe et al. | |
| 2015/0277628 A1 | 10/2015 | Leong et al. | |
| 2015/0301422 A1 | 10/2015 | Miyake et al. | |
| 2015/0311260 A1 | 10/2015 | Senda et al. | |
| 2016/0282990 A1 | 9/2016 | Kimura et al. | |
| 2016/0299601 A1 | 10/2016 | Yamazaki et al. | |

FOREIGN PATENT DOCUMENTS

| | | |
|---|---|---|
| JP | 2007-096055 A | 4/2007 |
| JP | 2007-123861 A | 5/2007 |
| JP | 2009-244958 A | 10/2009 |
| JP | 2011-137882 A | 7/2011 |
| JP | 2011-197685 A | 10/2011 |
| JP | 2012-208263 A | 10/2012 |
| JP | 2014-044537 A | 3/2014 |
| JP | 2014-178847 A | 9/2014 |
| KR | 2013-0101141 A | 9/2013 |
| WO | WO-2010/088666 | 8/2010 |
| WO | WO-2010/088670 | 8/2010 |

* cited by examiner

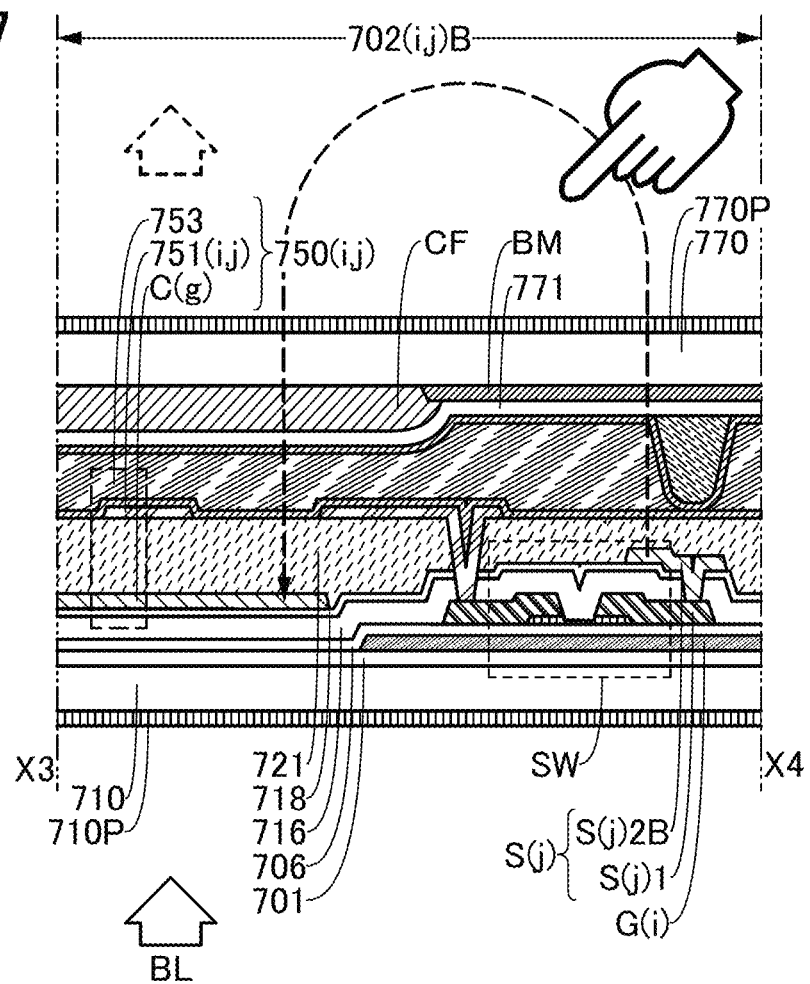

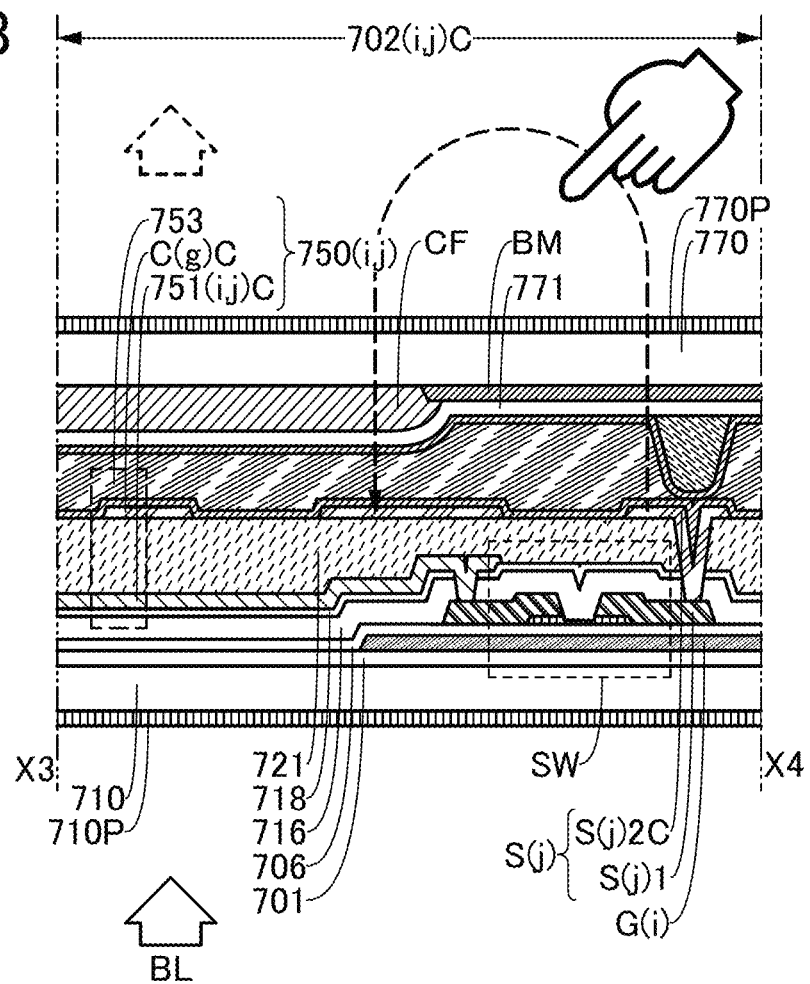

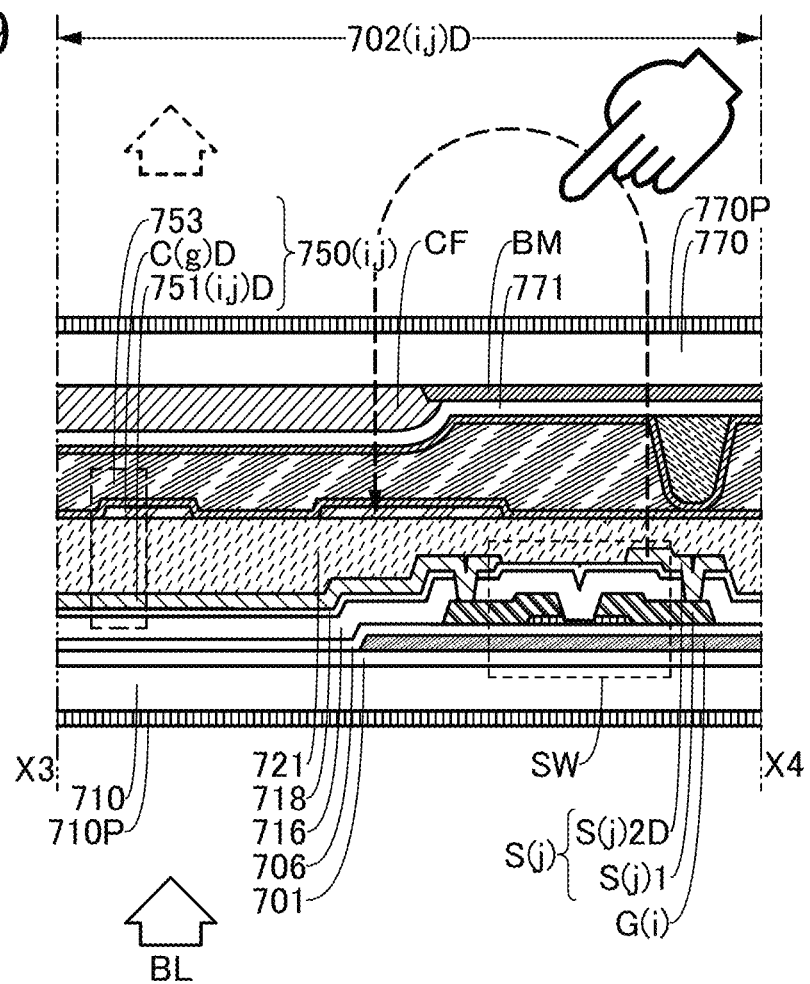

FIG. 16A1 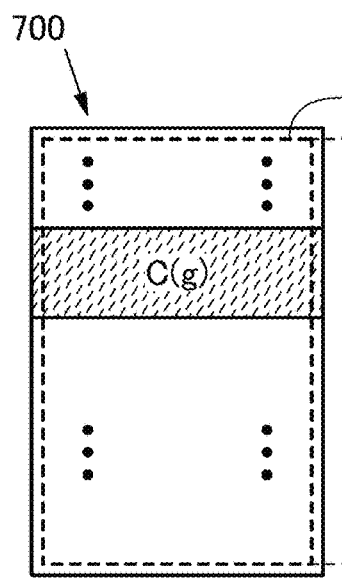
FIG. 16A2 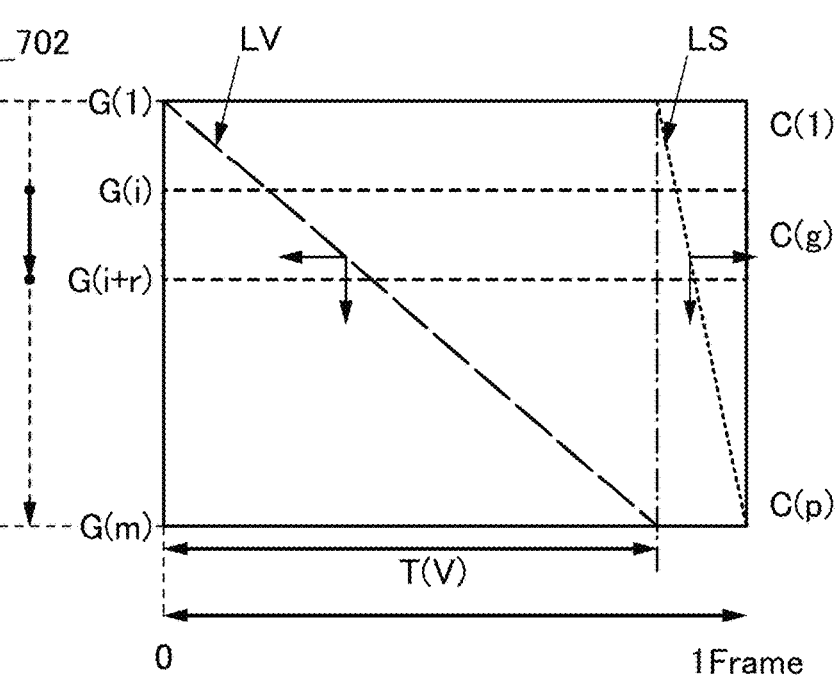
FIG. 16B1 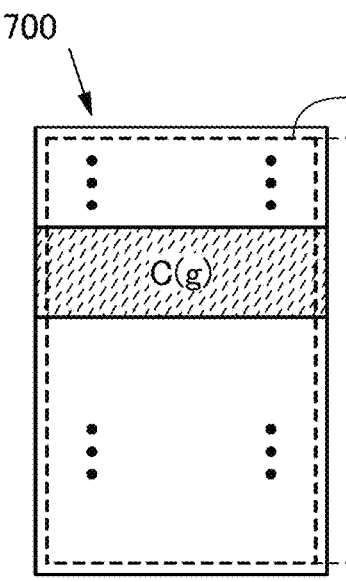
FIG. 16B2 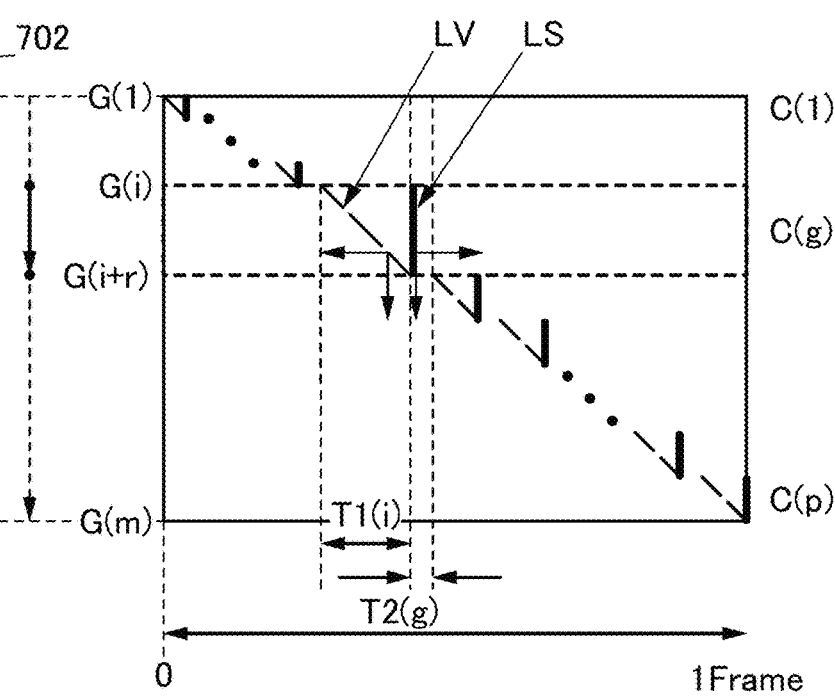

INPUT/OUTPUT PANEL AND INPUT/OUTPUT DEVICE

CROSS-REFERENCE TO RELATED APPLICATIONS

This application is a continuation of U.S. application Ser. No. 17/236,185, filed Apr. 21, 2021, now pending, which is a continuation of U.S. application Ser. No. 15/450,174, filed Mar. 6, 2017, now abandoned, which claims the benefit of a foreign priority application filed in Japan as Serial No. 2016-047788 on Mar. 11, 2016, all of which are incorporated by reference.

BACKGROUND OF THE INVENTION

1. Field of the Invention

One embodiment of the present invention relates to an input/output panel, an input/output device, or a semiconductor device.

Note that one embodiment of the present invention is not limited to the above technical field. The technical field of one embodiment of the invention disclosed in this specification and the like relates to an object, a method, or a manufacturing method. Furthermore, one embodiment of the present invention relates to a process, a machine, manufacture, or a composition of matter. Specifically, examples of the technical field of one embodiment of the present invention disclosed in this specification include a semiconductor device, a display device, a light-emitting device, a power storage device, a memory device, a method for driving any of them, and a method for manufacturing any of them.

2. Description of the Related Art

A structure in which a common electrode for a display provided in a liquid crystal display element is used also as one of a pair of electrodes for a touch sensor (a drive electrode), the other of the electrodes (a detection electrode for a sensor) is additionally formed, and an existing common drive signal as a drive signal for a display is used also as a drive signal for a touch sensor is known (Patent Document 1).

Touch sensing circuits in which circuit elements, such as touch signal lines (e.g., as drive lines and sense lines) and grounding regions, in display pixel stackups are grouped together, and which sense a touch on or near the display are known (Patent Document 2).

REFERENCE

Patent Document

[Patent Document 1] Japanese Published Patent Application No. 2009-244958
[Patent Document 2] Japanese Published Patent Application No. 2011-197685

SUMMARY OF THE INVENTION

An object of one embodiment of the present invention is to provide a novel input/output panel that is highly convenient or reliable. Another object is to provide a novel input/output device that is highly convenient or reliable. Another object is to provide a novel input/output panel, a novel input/output device, or a novel semiconductor device.

Note that the description of these objects does not disturb the existence of other objects. In one embodiment of the present invention, there is no need to achieve all the objects. Other objects will be apparent from and can be derived from the description of the specification, the drawings, the claims, and the like.

(1) One embodiment of the present invention is an input/output panel that includes a pixel, a sensor element, and a signal line.

The sensor element has a region overlapping with a pixel.

The signal line is electrically connected to the sensor element and the pixel.

(2) One embodiment of the present invention is the input/output panel described in (1) which further includes a control line and a scan line.

The control line is electrically connected to the sensor element.

The scan line is electrically connected to the pixel.

Thus, through one signal line, an image signal and a sensing signal can be supplied. That is, the number of wirings can be reduced. Furthermore, an object approaching the pixel can be sensed. As a result, a novel input/output panel that is highly convenient or reliable can be provided.

(3) One embodiment of the present invention is the input/output panel described in (2) in which the sensor element includes a first conductive film and a second conductive film.

The first conductive film is electrically connected to the control line.

The second conductive film is electrically connected to the signal line, and provided such that an electric field is formed between the first conductive film and the second conductive film.

The electric field has a region shielded by an approaching object.

Thus, an object approaching the pixel can be sensed on the basis of a change in electrostatic capacitance. Alternatively, the first conductive film and the second conductive film can be used for a mutual-capacitive proximity sensor. As a result, a novel input/output panel that is highly convenient or reliable can be provided.

(4) One embodiment of the present invention is the input/output panel described in (2) or (3) in which the pixel includes a pixel circuit and a display element.

The pixel circuit is electrically connected to the signal line and the scan line.

The display element is electrically connected to the pixel circuit, and includes a first electrode and a second electrode.

The first electrode is electrically connected to the pixel circuit.

The second electrode is electrically connected to the control line.

Thus, through one control line, power can be supplied to the pixel and a control signal can be supplied to the sensor element, for example. That is, the number of wirings can be reduced. As a result, a novel input/output panel that is highly convenient or reliable can be provided.

(5) One embodiment of the present invention is the input/output panel described in any of (2) to (4) further including one group of sensor elements and another group of sensor elements.

The one group of sensor elements include the sensor element. The one group of sensor elements are arranged in a row direction. The one group of sensor elements are electrically connected to the control line.

The other group of sensor elements include the sensor element. The other group of sensor elements are arranged in a column direction that intersects the row direction. The other group of sensor elements are electrically connected to the signal line.

(6) One embodiment of the present invention is the input/output panel described in any of (2) to (5) further including one group of pixels and another group of pixels.

The one group of pixels include the pixel. The one group of pixels are arranged in a row direction. The one group of pixels are electrically connected to the scan line.

The other group of pixels include the pixel. The other group of pixels are arranged in a column direction that intersects the row direction. The other group of pixels are electrically connected to the signal line.

In this manner, a plurality of sensor elements can be arranged in a matrix, for example. A plurality of display elements can be arranged in a matrix, for example. Furthermore, the position of an object approaching a pixel can be detected. Moreover, an image can be displayed. As a result, a novel input/output panel that is highly convenient or reliable can be provided.

(7) One embodiment of the present invention is the input/output panel described in any one of (2) to (6) in which the sensor element has a region overlapping with a plurality of pixels.

The plurality of pixels include a pixel electrically connected to one scan line and a pixel electrically connected to another scan line. The plurality of pixels include a pixel electrically connected to the signal line and a pixel electrically connected to another signal line.

Thus, display elements can be arranged at a higher density than sensor elements. Furthermore, the panel can display an image with higher resolution than optical resolution of positional data acquired by the sensor element. As a result, a novel input/output panel that is highly convenient or reliable can be provided.

(8) One embodiment of the present invention is an input/output device including the input/output panel described in any one of (1) to (7), an oscillator circuit, a switching circuit, a driver circuit, and a sensor circuit.

The oscillator circuit is electrically connected to the control line.

The driver circuit is electrically connected to the switching circuit.

The sensor circuit is electrically connected to the switching circuit.

The switching circuit is electrically connected to the signal line, and configured to electrically connect the driver circuit or the sensor circuit to the signal line on the basis of a switching signal.

Thus, through one signal line, an image signal can be supplied to the pixel and a sensing signal can be supplied to a sensor circuit, for example. Furthermore, the number of wirings can be reduced. As a result, a novel input/output device that is highly convenient or reliable can be provided.

Although the block diagram attached to this specification shows components classified by their functions in independent blocks, it is difficult to classify actual components according to their functions completely and it is possible for one component to have a plurality of functions.

In this specification, the terms "source" and "drain" of a transistor interchange with each other depending on the polarity of the transistor or the levels of potentials applied to the terminals. In general, in an n-channel transistor, a terminal to which a lower potential is applied is called a source, and a terminal to which a higher potential is applied is called a drain. In a p-channel transistor, a terminal to which a lower potential is applied is called a drain, and a terminal to which a higher potential is applied is called a source. In this specification, although connection relation of the transistor is described assuming that the source and the drain are fixed for convenience in some cases, actually, the names of the source and the drain interchange with each other depending on the relation of the potentials.

Note that in this specification, the term "source" of a transistor means a source region that is part of a semiconductor film functioning as an active layer or a source electrode connected to the semiconductor film. Similarly, the term "drain" of a transistor means a drain region that is part of the semiconductor film or a drain electrode connected to the semiconductor film. The term "gate" means a gate electrode.

In this specification, a state in which transistors are connected in series means, for example, a state in which only one of a source and a drain of a first transistor is connected to only one of a source and a drain of a second transistor. In addition, a state in which transistors are connected in parallel means a state in which one of a source and a drain of a first transistor is connected to one of a source and a drain of a second transistor and the other of the source and the drain of the first transistor is connected to the other of the source and the drain of the second transistor.

In this specification, the term "connection" means electrical connection and corresponds to a state where current, voltage, or a potential can be supplied or transmitted. Accordingly, connection means not only direct connection but also indirect connection through a circuit element such as a wiring, a resistor, a diode, or a transistor so that current, voltage, or a potential can be supplied or transmitted.

In this specification, even when a circuit diagram illustrates independent components that are connected to each other, there is a case where one conductive film has functions of a plurality of components, such as the case where part of a wiring functions as an electrode. In this specification, the term "connection" also means such a case where one conductive film has functions of a plurality of components.

Furthermore, in this specification, one of a first electrode and a second electrode of a transistor refers to a source electrode and the other refers to a drain electrode.

According to one embodiment of the present invention, a novel input/output panel that is highly convenient or reliable can be provided. According to another embodiment of the present invention, a novel input/output device that is highly convenient or reliable can be provided. According to another embodiment of the present invention, a novel input/output panel, a novel input/output device, or a novel semiconductor device can be provided.

Note that the description of these effects does not disturb the existence of other effects. One embodiment of the present invention does not necessarily achieve all the effects listed above. Other effects will be apparent from and can be derived from the description of the specification, the drawings, the claims, and the like.

BRIEF DESCRIPTION OF THE DRAWINGS

FIG. 7 is a cross-sectional view illustrating a structure of a pixel that can be used in an input/output device of Embodiment.

FIG. 8 is a cross-sectional view illustrating a structure of a pixel that can be used in an input/output device of Embodiment.

FIG. 9 is a cross-sectional view illustrating a structure of a pixel that can be used in an input/output device of Embodiment.

FIGS. 16A1, 16A2, 16B1, and 16B2 schematically illustrate a method for driving an input/output device of Embodiment.

DETAILED DESCRIPTION OF THE INVENTION

Figure 1A:
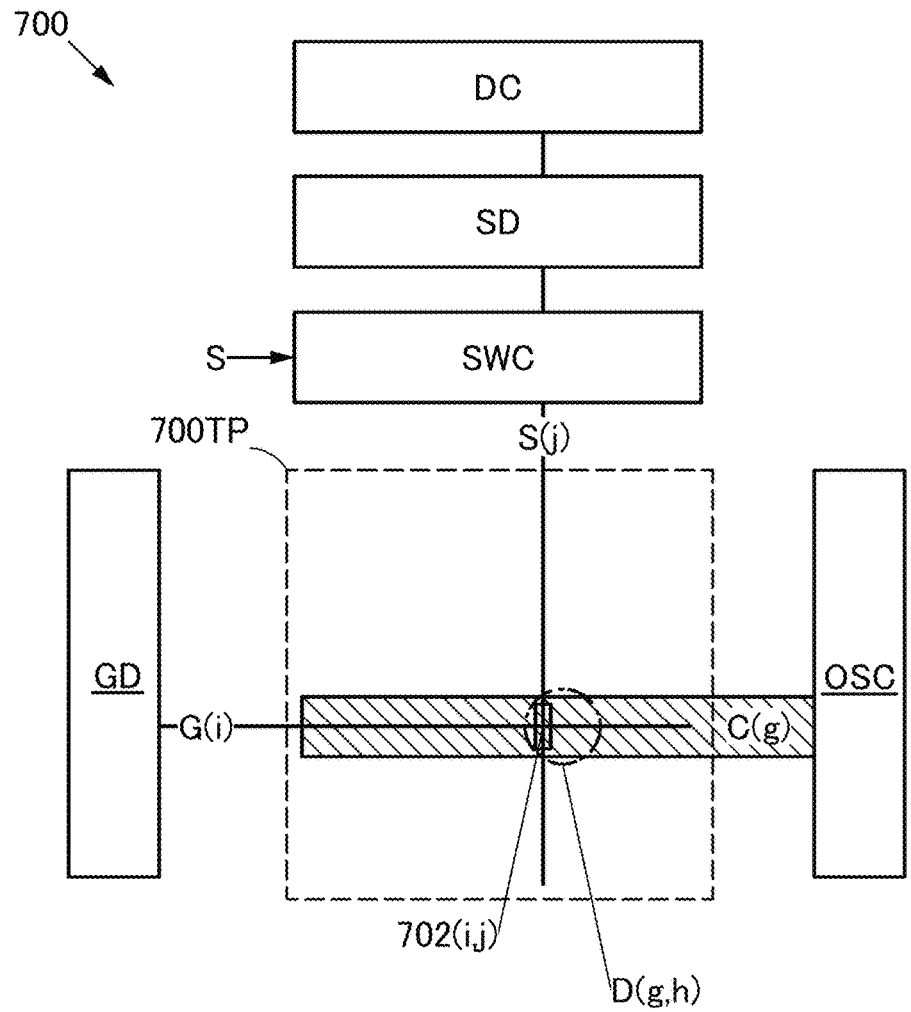
FIGS. 1A and 1B are a block diagram and a circuit diagram illustrating a structure of an input/output device of Embodiment.

An input/output panel of one embodiment of the present invention includes a pixel, a sensor element, a signal line, a control line, and a scan line. The sensor element has a region overlapping with the pixel. The signal line is electrically connected to the sensor element and the pixel. The control line is electrically connected to the sensor element. The scan line is electrically connected to the pixel.

Thus, through one signal line, an image signal can be supplied to the pixel and a sensing signal can be supplied to a sensor circuit, for example. Furthermore, the number of wirings can be reduced. Moreover, an object approaching the pixel can be sensed. As a result, a novel input/output panel that is highly convenient or reliable can be provided.

Embodiments will be described in detail with reference to the drawings. Note that the present invention is not limited to the following description. It will be readily appreciated by those skilled in the art that modes and details of the present invention can be modified in various ways without departing from the spirit and scope of the present invention. Therefore, the present invention should not be construed as being limited to the description in the following embodiments. Note that in structures of the present invention described below, the same portions or portions having similar functions are denoted by the same reference numerals in different drawings, and description thereof is not repeated.

Embodiment 1

In this embodiment, structures of an input/output panel of one embodiment of the present invention are described with reference to FIGS. 1A and 1B, FIGS. 2A and 2B, FIGS. 3A and 3B, FIGS. 4A and 4B, FIG. 5, and FIGS. 6A and 6B.

FIGS. 1A and 1B and FIGS. 2A and 2B illustrate structures of an input/output device 700 and an input/output panel 700TP which are embodiments of the present invention.

Figure 1B:
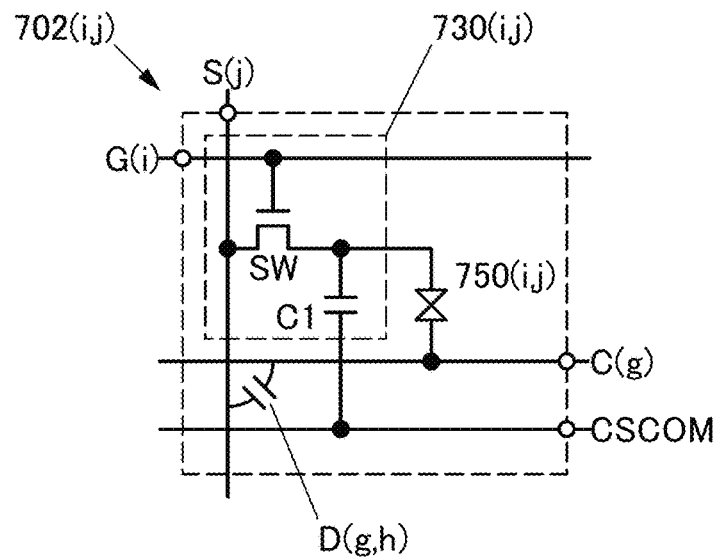

FIG. 1A is a block diagram of the input/output device 700 of one embodiment of the present invention. FIG. 1B is a circuit diagram illustrating part of the input/output panel 700TP in FIG. 1A.

Figure 2A:
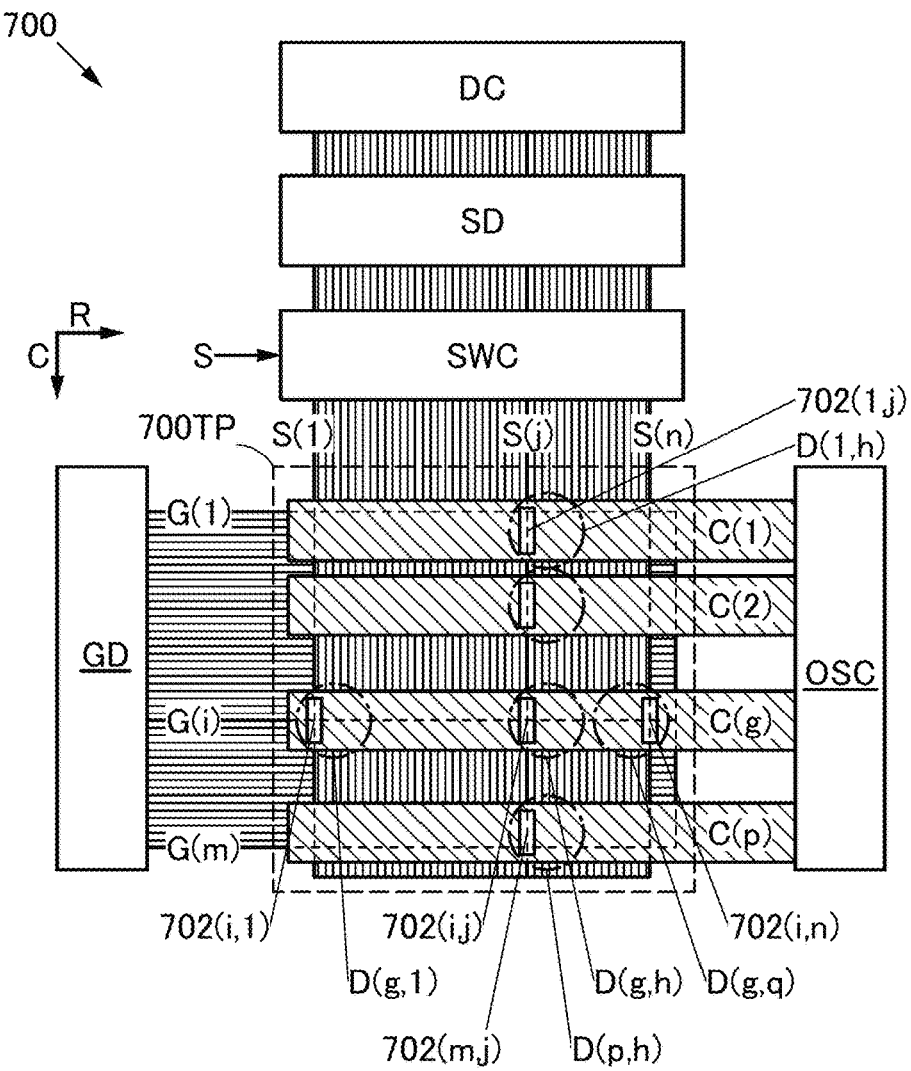
FIGS. 2A and 2B are a block diagram and a schematic diagram illustrating a structure of an input/output device of Embodiment.
Figure 2B:
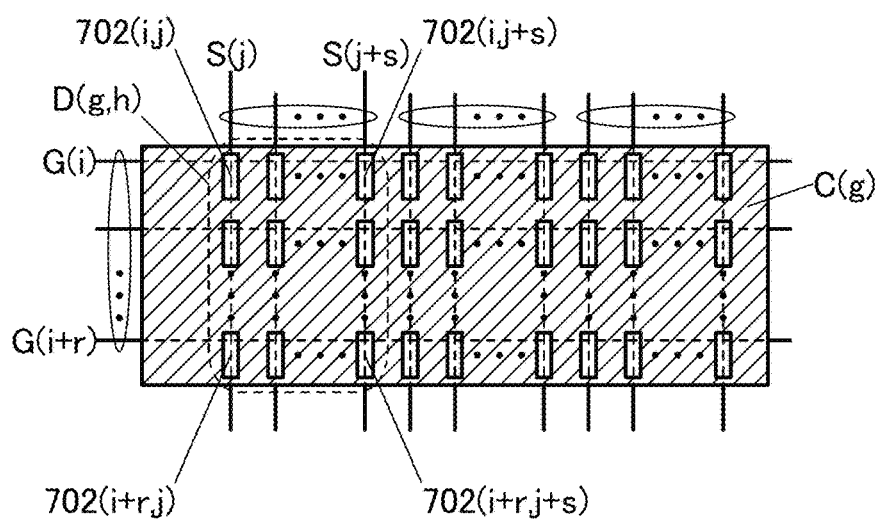

FIG. 2A is a block diagram of the input/output device 700 of one embodiment of the present invention. FIG. 2B is a block diagram illustrating part of the input/output panel 700TP in FIG. 2A.

FIGS. 3A and 3B and FIGS. 4A and 4B illustrate structures of a switching circuit and a sensor circuit which can be used for the input/output device of one embodiment of the present invention.

Figure 3A:
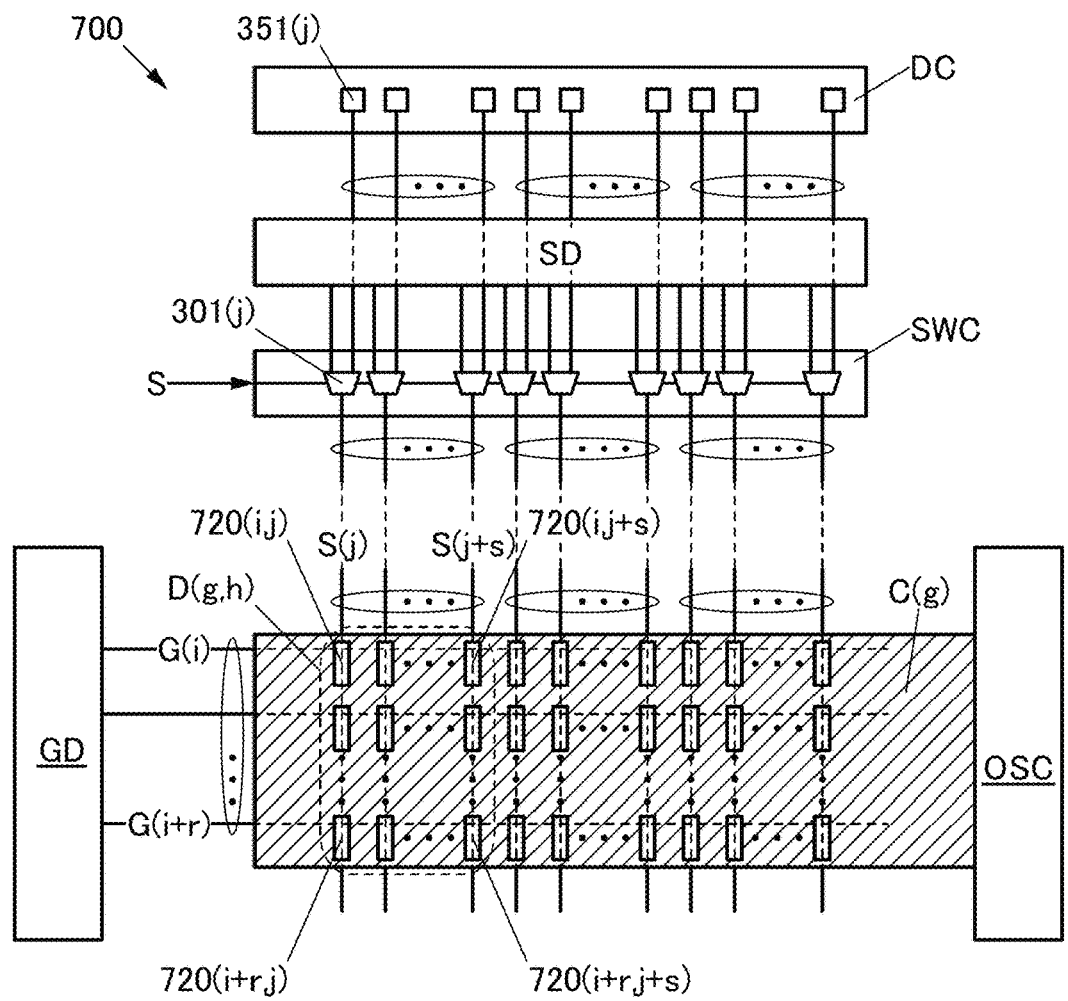
FIGS. 3A and 3B are block diagrams illustrating a structure of an input/output device of Embodiment.
Figure 3B:
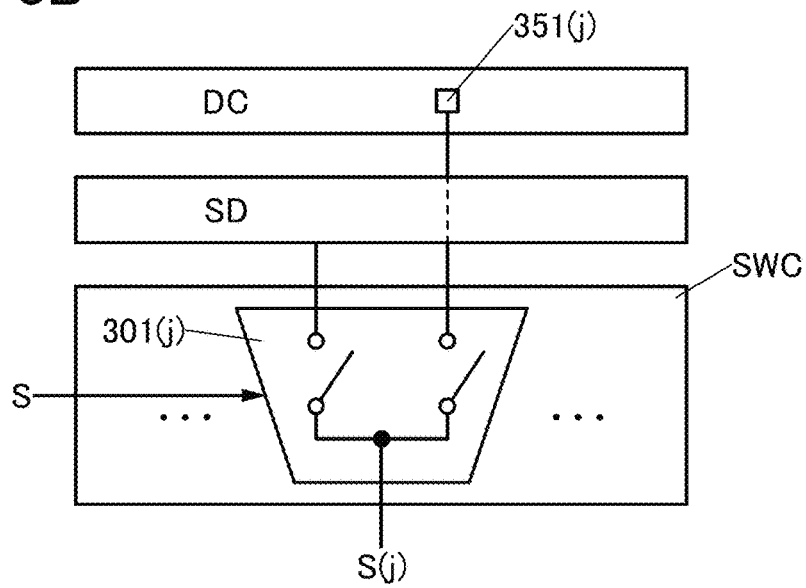

FIG. 3A is a block diagram illustrating a connection relation between a signal line S(j) and a switching circuit SWC and a connection relation between the switching circuit SWC and a sensor circuit DC. The signal line S(j), the switching circuit SWC, and the sensor circuit DC can be used for the input/output device of one embodiment of the present invention. FIG. 3B is a block diagram illustrating part of the switching circuit SWC in FIG. 3A.

Figure 4A:
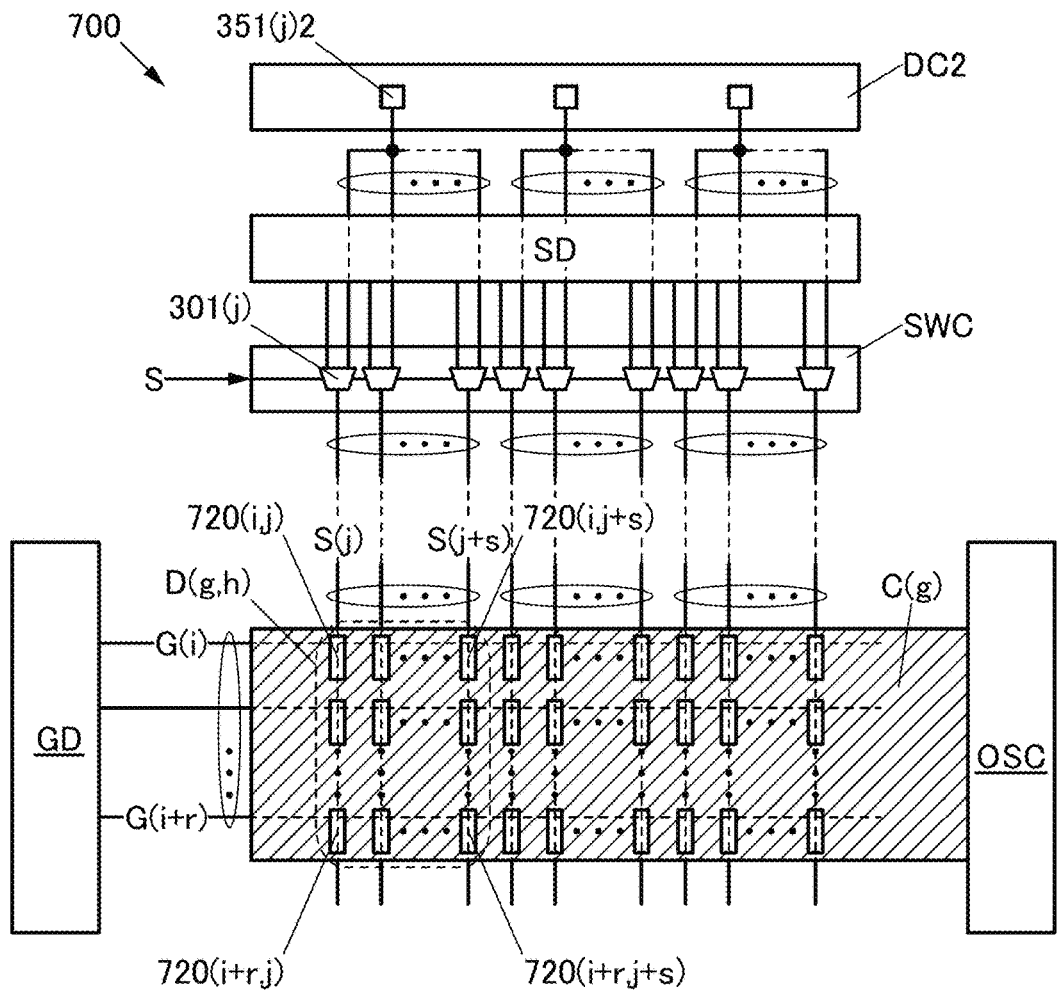
FIGS. 4A and 4B are block diagrams illustrating a structure of an input/output device of Embodiment.

FIG. 4A is a block diagram illustrating a connection relation between the switching circuit SWC and a sensor circuit DC2, which is different from the connection relation illustrated in FIG. 3A.

Figure 4B:
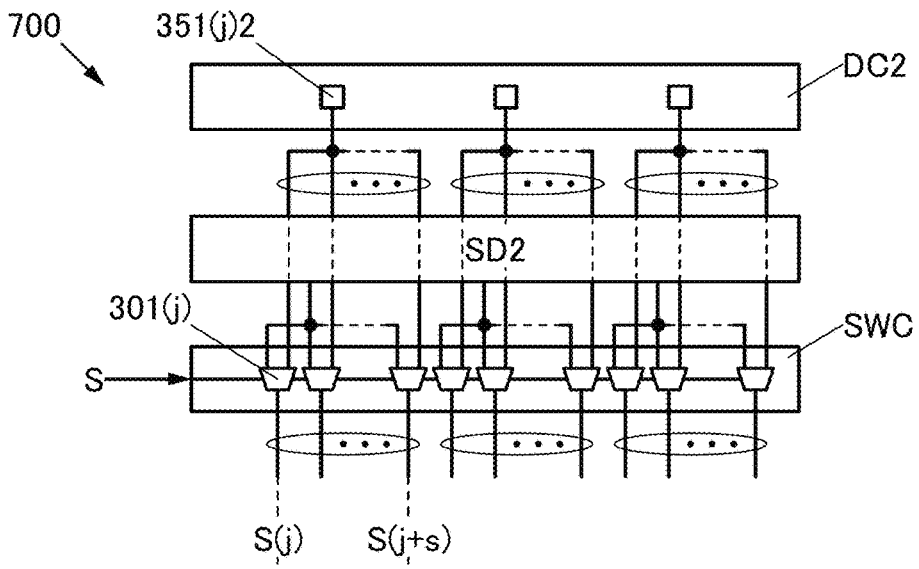

FIG. 4B is a block diagram illustrating a connection relation between the switching circuit SWC and a driver circuit SD2, which is different from the connection relation illustrated in FIG. 4A.

Figure 5:
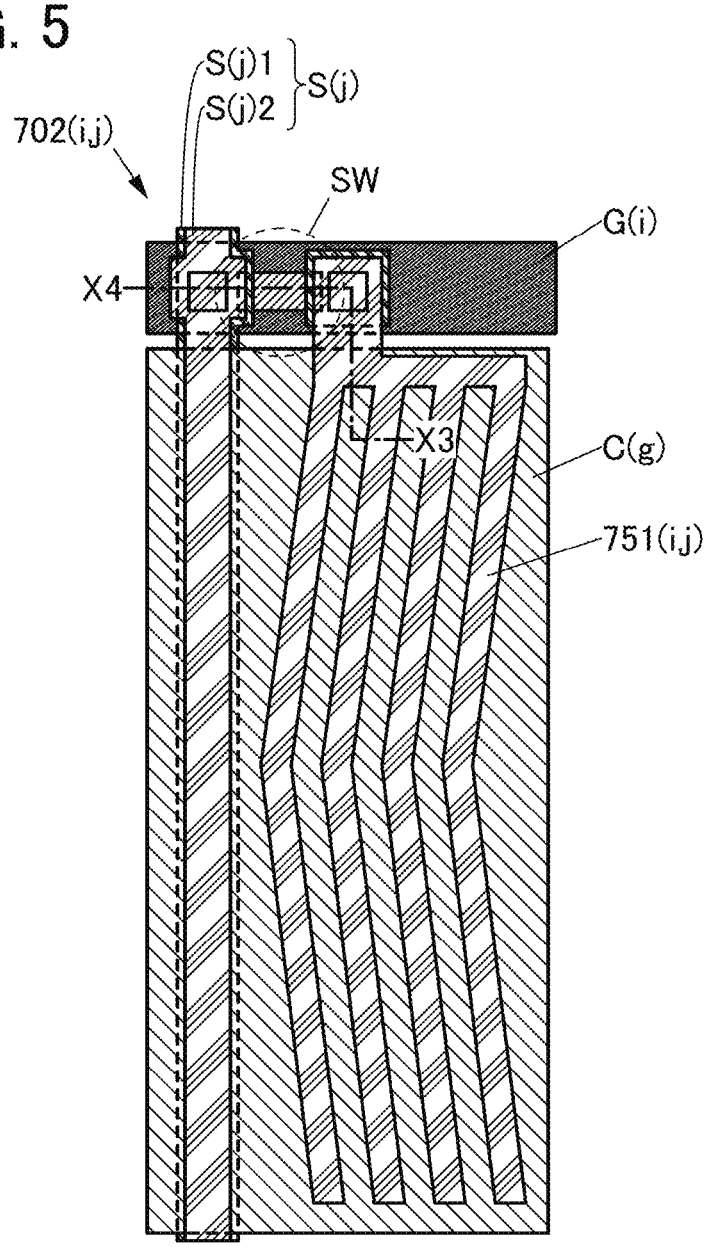
FIG. 5 is a top view illustrating a structure of a pixel that can be used in an input/output device of Embodiment.
Figure 6A:
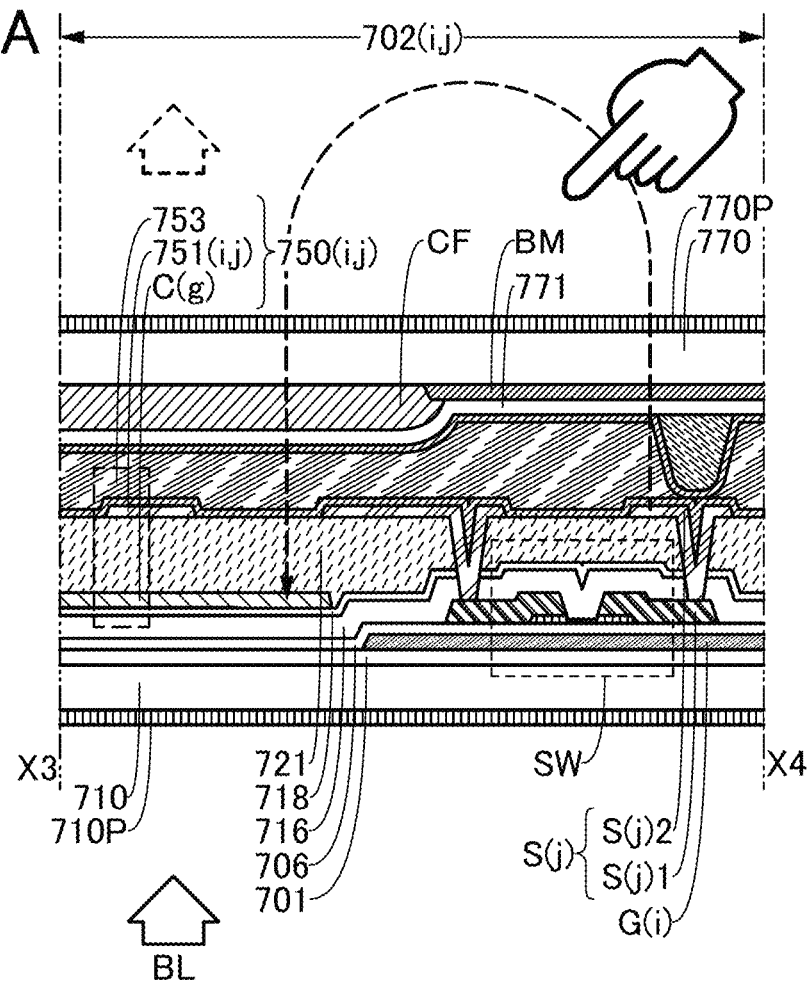
FIGS. 6A and 6B are cross-sectional views illustrating a structure of a pixel that can be used in an input/output device of Embodiment.
Figure 6B:
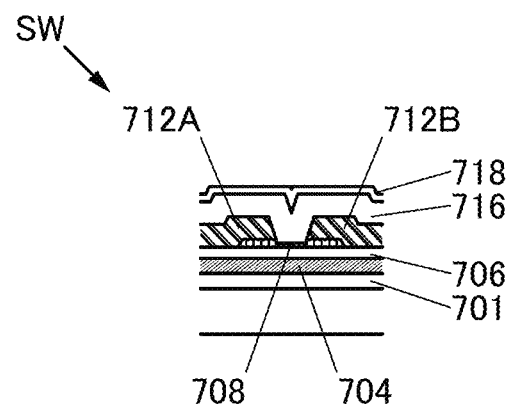

FIG. 5 and FIGS. 6A and 6B illustrate a structure of a pixel that can be used in the input/output device of one embodiment of the present invention.

FIG. 5 is a top view illustrating the structure of the pixel that can be used in the input/output device of one embodiment of the present invention. FIG. 6A is a cross-sectional view taken along the cutting-plane line X3-X4 in FIG. 5. FIG. 6B is a cross-sectional view illustrating part of FIG. 6A.

Note that in this specification, an integral variable of 1 or larger may be used for reference numerals. For example, "(p)" where p is an integral value of 1 or more may be used for part of a reference numeral that specifies any one of components (p components in maximum). For another example, "(m, n)" where m and n are each an integral value of 1 or more may be used for part of a reference numeral that specifies any one of components (m×n components in maximum).

<Structure Example of Input/Output Device>

The input/output device 700 described in this embodiment includes the input/output panel 700TP, the oscillator circuit OSC, the switching circuit SWC, a driver circuit SD, and the sensor circuit DC (see FIG. 1A).

The oscillator circuit OSC is electrically connected to a control line C(g).

The driver circuit SD is electrically connected to the switching circuit SWC.

The sensor circuit DC is electrically connected to the switching circuit SWC.

The switching circuit SWC is electrically connected to the signal line S(j), and is configured to electrically connect the driver circuit SD or the sensor circuit DC to the signal line S(j) in accordance with the switching signal S.

<Structure Example of Input/Output Panel>

(1) The input/output panel 700TP described in this embodiment includes a pixel 702(i, j), a sensor element D(g, h), and the signal line S(j). Note that each of g, h, i, and j independently represents a variable and an integer of 1 or larger.

The sensor element D(g, h) has a region overlapping with the pixel 702(i, j).

The signal line S(j) is electrically connected to the sensor element D(g, h) and the pixel 702(i, j) (see FIG. 1B).

(2) The input/output panel 700TP includes the control line C(g) and a scan line G(i).

The control line C(g) is electrically connected to the sensor element D(g, h).

The scan line G(i) is electrically connected to the pixel 702(i, j).

Thus, through one signal line, an image signal and a sensing signal can be supplied. That is, the number of wirings can be reduced. As a result, a novel input/output panel that is highly convenient or reliable can be provided.

(3) The sensor element D(g, h) included in the input/output panel 700TP includes a first conductive film and a second conductive film.

The first conductive film is electrically connected to the control line C(g). The second conductive film is electrically connected to the signal line S(j). For example, the control line C(g) can be used as the first conductive film. Furthermore, for example, the signal line S(j) can be used as the second conductive film (see FIG. 1B, FIG. 5, and FIG. 6A).

The second conductive film is provided such that an electric field is formed between the first conductive film and the second conductive film (see FIG. 1B and FIG. 6A). The electric field has a region shielded by an approaching object. In other words, the signal line S(j) is provided such that an electric field having a region shielded by an approaching object is formed between the control line C(g) and the signal line S(j).

Thus, an object approaching the pixel can be sensed on the basis of a change in electrostatic capacitance. As a result, a novel input/output panel that is highly convenient or reliable can be provided.

For example, a signal line S(j)1 and a signal line S(j)2 can be used as the signal line S(j) (see FIG. 6A). Specifically, a conductive film that is closer to an object approaching a display surface of the input/output panel 700TP than the signal line S(j)1 is can be used for the signal line S(j)2. Thus, the sensitivity for sensing an object approaching the input/output panel can be improved. A conductive film that can be formed in the same step as the first electrode 751(i, j) can be used for the signal line S(j)2, for example.

(4) The pixel 702(i, j) included in the input/output panel 700TP includes a pixel circuit 730(i, j) and a display element 750(i, j) (see FIG. 1B).

The pixel circuit 730(i, j) is electrically connected to the signal line S(j) and the scan line G(i).

The display element 750(i, j) is electrically connected to the pixel circuit 730 (i, j). The display element 750(i, j) includes a first electrode 751(i, j) and a second electrode (see FIG. 1B, FIG. 5, and FIG. 6A). The display element 750(i, j) can include a layer 753 containing a liquid crystal material.

The first electrode 751(i, j) is electrically connected to the pixel circuit 730(i, j).

The second electrode is electrically connected to the control line C(g). Note that the control line C(g) can be used for the second electrode, for example.

Thus, through one control line, power can be supplied to the pixel and a control signal can be supplied to the sensor element, for example. That is, the number of wirings can be reduced. As a result, a novel input/output panel that is highly convenient or reliable can be provided.

(5) The input/output panel 700TP includes one group of sensor elements D(g, 1) to D(g, q) and another group of sensor elements D(1, h) to D(p, h) (see FIG. 2A).

The one group of sensor elements D(g, 1) to D(g, q) include the sensor element D(g, h). The one group of sensor elements D(g, 1) to D(g, q) are arranged in the row direction (the direction indicated by an arrow R in the drawing) and electrically connected to the control line C(g).

The other group of sensor elements D(1, h) to D(p, h) include the sensor element D(g, h). The other group of sensor elements D(1, h) to D(p, h) are arranged in the column direction (the direction indicated by an arrow C) that intersects the row direction and electrically connected to the signal line S(j).

(6) The input/output panel 700TP includes one group of pixels 702(i, 1) to 702(i, n) and another group of pixels 702(1, j) to 702(m, j).

The one group of pixels 702(i, 1) to 702(i, n) include the pixel 702(i, j). The one group of pixels 702(i, 1) to 702(i, n) are arranged in the row direction, and electrically connected to the scan line G(i).

The other group of pixels 702(1, j) to 702(m, j) include the pixel 702(i, j). The other group of pixels 702(1, j) to 702(m, j) are arranged in the column direction that intersects the row direction, and electrically connected to the signal line S(j).

In this manner, a plurality of sensor elements can be arranged in a matrix, for example. A plurality of display elements can be arranged in a matrix, for example. Furthermore, the position of an object approaching a pixel can be detected. Moreover, an image can be displayed. As a result, a novel input/output panel that is highly convenient or reliable can be provided.

(7) The sensor element D(g, h) included in the input/output panel 700TP has regions overlapping with the pixel 702(i, j) to a pixel 702(i+r, j+s) (see FIG. 2B). Note that each of r and s independently represents a variable and an integer of 1 or larger.

The pixels 702(i, j) to 702(i+r, j+s) include the pixels 702(i, j) to 702(i, j+s). Note that the pixels 702(i, j) to 702(i, j+s) are electrically connected to the scan line G(i).

The pixels 702(i, j) to 702(i+r, j+s) include the pixels 702(i+r, j) to 702(i+r, j+s). Note that the pixels 702(i+r, j) to 702(i+r, j+s) are electrically connected to a scan line G(i+r).

The pixels 702(i, j) to 702(i+r, j+s) include the pixels 702(i, j) to 702(i+r, j). Note that the pixels 702(i, j) to 702(i+r, j) are electrically connected to the signal line S(j).

The pixels 702(i, j) to 702(i+r, j+s) include the pixels 702(i, j+s) to 702(i+r, j+s). Note that the pixels 702(i, j+s) to 702(i+r, j+s) are electrically connected to a signal line S(j+s).

Thus, display elements can be arranged at a higher density than sensor elements. Furthermore, the panel can display an image with higher resolution than optical resolution of positional data acquired by the sensor element. As a result, a novel input/output panel that is highly convenient or reliable can be provided.

A structure example of the pixel 702(i, j) that can be used in the input/output device 700 of one embodiment of the present invention is described with reference to FIG. 1B, FIG. 5, and FIGS. 6A and 6B.

The pixel 702(i, j) includes the pixel circuit 730(i, j) and the display element 750(i, j) (see FIG. 1B).

The pixel circuit 730(i, j) includes a transistor SW and a capacitor C1.

A gate electrode of the transistor SW is electrically connected to the scan line G(i). A first electrode of the transistor SW is electrically connected to the signal line S(j).

A first electrode of the capacitor C1 is electrically connected to a second electrode of the transistor SW. A second electrode of the capacitor C1 is electrically connected to a conductive film CSCOM.

The display element 750(i, j) included in the input/output panel 700TP includes the first electrode 751(i, j), the second electrode, and the layer 753 containing a liquid crystal material (see FIG. 6A). Note that the control line C(g) can be used for the second electrode. The second electrode is provided such that an electric field that controls the orientation of the liquid crystal material is formed between the first electrode 751(i, j) and the second electrode.

The first electrode 751(i, j) is electrically connected to the second electrode of the transistor SW. The second electrode of the display element 750(i, j) is electrically connected to the control line C(g) (see FIG. 1B).

The input/output panel 700TP of one embodiment of the present invention includes a color film CF, a light-blocking film BM, a functional film 710P, and a functional film 770P (see FIG. 6A).

The color film CF has a region overlapping with the display element 750(i, j).

The light-blocking film BM has an opening in a region overlapping with the display element 750(i, j).

The insulating film 771 has a region sandwiched by the layer 753 containing a liquid crystal material and the light-blocking film BM and a region sandwiched by the layer 753 containing a liquid crystal material and the color film CF.

The functional film 770P has a region in which the display element 750(i, j) is sandwiched by the functional film 710P and the functional film 770P.

The input/output panel 700TP of one embodiment of the present invention includes a base 710 and a base 770. The base 770 has a region overlapping with the base 710 and has a region in which the display element 750(i, j) is sandwiched by the base 710 and the base 770.

The input/output panel 700TP of one embodiment of the present invention includes an insulating film 721, an insulating film 718, an insulating film 716, an insulating film 701, and an insulating film 706.

The insulating film 721 has a region sandwiched by the layer 753 containing a liquid crystal material and the transistor SW. The insulating film 718 has a region sandwiched by the insulating film 721 and the transistor SW. The insulating film 716 has a region sandwiched by the insulating film 718 and the transistor SW. The insulating film 701 has a region sandwiched by the transistor SW and the base 710. The insulating film 706 has a region sandwiched by the insulating film 716 and the insulating film 701.

<Switching Circuit SWC>
The switching circuit SWC is electrically connected to signal lines S(1) to S(n) (see FIG. 2A).

The switching circuit SWC includes one group of circuits 301(1) to 301(n) (not shown). The one group of circuits 301(1) to 301(n) include the circuit 301(j) (see FIG. 3A or FIG. 3B).

The circuit 301(j) and the signal line S(j) are electrically connected to each other. The circuit 301(j) electrically connects the driver circuit SD or the sensor circuit DC to the signal line S(j) in accordance with the switching signal S.

For example, in a period during which the driver circuit SD and the signal line S(j) are electrically connected, the sensor circuit DC and the signal line S(j) are electrically disconnected. For example, in a period during which the driver circuit SD and the signal line S(j) are electrically disconnected, the sensor circuit DC and the signal line S(j) are electrically connected.

Note that for distribution of image signals supplied by the driver circuit, the switching circuit SWC can be used as a demultiplexer (see FIG. 4B). For example, one output terminal of a driver circuit SD2, which has a smaller number of output terminals than the driver circuit SD, supplies serial signals including image signals to be supplied to the signal lines S(j) to S(j+s), and the switching circuit SWC distributes the serial signals to the respective signal lines. Thus, the size of the driver circuit SD2 can be smaller than that of the driver circuit SD.

<Sensor Circuit DC>
The sensor circuit DC includes one group of circuits 351(1) to 351(n) (not shown). The one group of circuits 351(1) to 351(n) include the circuit 351(j) (see FIG. 3A or FIG. 3B).

For example, in a period during which the circuit 351(j) and the signal line S(j) are electrically connected via the circuit 301(j), the circuit 351(j) is configured to supply a sensing signal in accordance with a change in potential of the signal line S(j).

Note that for example, the sensor circuit DC2 can be used instead of the sensor circuit DC (see FIG. 4A). The sensor circuit DC2 includes one group of circuits 351(1)2 to 351(q)2 (not shown). The one group of circuits 351(1)2 to 351(q)2 include the circuit 351(j)2.

For example, in a period during which the circuit 351(j)2 and the signal line S(j) are electrically connected via the circuit 301(j), the circuit 351(j)2 is configured to supply a sensing signal in accordance with a change in potential of a node at which the signal lines S(j) to S(j+s) are connected. Owing to the one group of circuits 351(1)2 to 351(q)2, the size of the sensor circuit DC2 can be small.

<Driver Circuit SD>
The driver circuit SD is configured to, for example, generate an image signal supplied to a pixel circuit in accordance with image data. Specifically, the driver circuit SD is configured to generate a signal whose polarity is inverted. Thus, for example, a liquid crystal element can be driven.

For example, any of a variety of sequential circuits, such as a shift register, can be used as the driver circuit SD.

For example, an integrated circuit can be used as the driver circuit SD. Specifically, an integrated circuit formed on a silicon substrate can be used as the driver circuit SD.

For example, the driver circuit SD can be mounted on a terminal by a chip on glass (COG) method. Specifically, an anisotropic conductive film can be used to mount an integrated circuit on the terminal. Alternatively, a chip on film (COF) method may be used to mount an integrated circuit on the terminal.

<Oscillator Circuit OSC>

The oscillator circuit OSC is electrically connected to the control line C(g) and has a function of supplying a control signal. For example, a rectangular wave, a sawtooth wave, or a triangular wave can be used for the control signal.

<<Components>>

Components of the input/output device and the input/output panel are described below. Note that these components cannot be clearly distinguished and one component may also serve as another component or include part of another component.

For example, the control line C(g) serves as the first conductive film of the sensor element D(g, h) and as the second electrode of the display element 750(i, j).

The input/output device 700 of one embodiment of the present invention includes the input/output panel 700TP, the oscillator circuit OSC, the switching circuit SWC, the driver circuit SD, and the sensor circuit DC.

The input/output device 700 of one embodiment of the present invention includes the pixel 702(i, j), the sensor element D(g, h), the signal line S(i), the control line C(g), and the scan line G(i).

The input/output device 700 of one embodiment of the present invention includes the first conductive film, the second conductive film, the pixel circuit 730(i, j), and the display element 750(i, j).

The input/output device 700 of one embodiment of the present invention includes the transistor SW, the capacitor C1, the first electrode 751(i, j), the second electrode, and the layer 753 containing a liquid crystal material.

The input/output device 700 of one embodiment of the present invention includes the color film CF, the light-blocking film BM, the functional film 710P, and the functional film 770P.

The input/output device 700 of one embodiment of the present invention includes the insulating film 771, the insulating film 721, the insulating film 718, the insulating film 716, the insulating film 701, and the insulating film 706.

The input/output device 700 of one embodiment of the present invention includes the base 710 and the base 770.

<<Wiring, Conductive Film>>

A conductive material can be used for the wiring or the like. Specifically, a conductive material can be used for the signal line S(i), the control line C(g), the scan line G(i), the first conductive film, the second conductive film, the first electrode 751(i, j), the second electrode, the conductive film CSCOM, or the like.

For example, an inorganic conductive material, an organic conductive material, a metal, or conductive ceramics can be used for the wiring or the like.

Specifically, a metal element selected from aluminum, gold, platinum, silver, copper, chromium, tantalum, titanium, molybdenum, tungsten, nickel, iron, cobalt, palladium, and manganese can be used for the wiring or the like. Alternatively, an alloy including any of the above-described metal elements, or the like can be used for the wiring or the like. In particular, an alloy of copper and manganese is suitably used in microfabrication using a wet etching method.

Specifically, any of the following structures can be used for the wiring or the like: a two-layer structure in which a titanium film is stacked over an aluminum film, a two-layer structure in which a titanium film is stacked over a titanium nitride film, a two-layer structure in which a tungsten film is stacked over a titanium nitride film, a two-layer structure in which a tungsten film is stacked over a tantalum nitride film or a tungsten nitride film, a three-layer structure in which a titanium film, an aluminum film, and a titanium film are stacked in this order, and the like.

Specifically, a conductive oxide, such as indium oxide, indium tin oxide, indium zinc oxide, zinc oxide, or zinc oxide to which gallium is added, can be used for the wiring or the like.

Specifically, a film containing graphene or graphite can be used for the wiring or the like.

For example, a film containing graphene oxide is formed and is reduced, so that a film containing graphene can be formed. As a reducing method, a method with application of heat, a method using a reducing agent, or the like can be employed.

A film containing a metal nanowire can be used for the wiring or the like, for example. Specifically, a nanowire containing silver can be used.

Specifically, a conductive high molecule can be used for the wiring or the like.

<<Transistor SW>>

For example, a bottom-gate transistor or a top-gate transistor can be used in the transistor SW or the like.

For example, a transistor including a semiconductor containing an element belonging to Group 14 in a semiconductor film can be used. Specifically, a semiconductor containing silicon can be used for a semiconductor film. For example, single crystal silicon, polysilicon, microcrystalline silicon, or amorphous silicon can be used for the semiconductor film of the transistor.

For example, a transistor including an oxide semiconductor in a semiconductor film can be used. Specifically, an oxide semiconductor containing indium or an oxide semiconductor containing indium, gallium, and zinc can be used for a semiconductor film.

For example, a transistor having a lower leakage current in an off state than a transistor that uses amorphous silicon for a semiconductor film can be used as the transistor SW or the like. Specifically, a transistor that uses an oxide semiconductor for a semiconductor film 708 can be used as the transistor SW or the like.

Thus, a pixel circuit including the transistor SW can hold an image signal for a longer time than a pixel circuit including a transistor that uses amorphous silicon for a semiconductor film. Specifically, the selection signal can be supplied at a frequency of lower than 30 Hz, preferably lower than 1 Hz, further preferably less than once per minute while flickering is suppressed. Consequently, eyestrain on a user of the input/output device can be reduced, and power consumption for driving can be reduced.

For example, a transistor including the semiconductor film 708, a conductive film 704, the insulating film 706, a conductive film 712A, and a conductive film 712B can be used as the transistor SW or the like (see FIG. 6B). Note that the conductive film 704 has a region overlapping with the semiconductor film 708, and the conductive films 712A and 712B are electrically connected to the semiconductor film 708. The insulating film 706 has a region sandwiched by the semiconductor film 708 and the conductive film 704.

Note that the conductive film 704 and the insulating film 706 serve as a gate electrode and a gate insulating film, respectively. The conductive film 712A serves as one of a source electrode and a drain electrode, and the conductive film 712B serves as the other of the source electrode and the drain electrode.

A conductive film in which a 10-nm-thick film containing tantalum and nitrogen and a 300-nm-thick film containing copper are stacked in this order can be used as the conductive film 704, for example.

A material in which a 400-nm-thick film containing silicon and nitrogen and a 200-nm-thick film containing silicon, oxygen, and nitrogen are stacked can be used as the insulating film 706, for example.

A 25-nm-thick film containing indium, gallium, and zinc can be used as the semiconductor film 708, for example.

A conductive film in which a 50-nm-thick film containing tungsten, a 400-nm-thick film containing aluminum, and a 100-nm-thick film containing titanium are stacked in this order can be used as the conductive film 712A or 712B, for example.

<<Display Element 750(i, j)>>

For example, a display element having a function of controlling transmission or reflection of light can be used as the display element 750(i, j) or the like. For example, a combined structure of a polarizing plate and a liquid crystal element or a MEMS shutter display element can be used.

For example, a liquid crystal element that can be driven by any of the following driving methods can be used: an in-plane switching (IPS) mode, a twisted nematic (TN) mode, a fringe field switching (FFS) mode, an axially symmetric aligned micro-cell (ASM) mode, an optically compensated birefringence (OCB) mode, a ferroelectric liquid crystal (FLC) mode, an antiferroelectric liquid crystal (AFLC) mode, and the like.

In addition, a liquid crystal element that can be driven by any of the following driving methods can be used: a vertical alignment (VA) mode such as a multi-domain vertical alignment (MVA) mode, a patterned vertical alignment (PVA) mode, an electrically controlled birefringence (ECB) mode, a continuous pinwheel alignment (CPA) mode, an advanced super view (ASV) mode, and the like.

The display element 750(i, j) includes the first electrode 751(i, j), the second electrode, and the layer 753 containing a liquid crystal material. The layer 753 containing a liquid crystal material contains a liquid crystal material whose orientation can be controlled by voltage applied between the first electrode 751(i, j) and the second electrode. For example, the orientation of the liquid crystal material can be controlled by an electric field in the thickness direction (also referred to as the vertical direction) or an electric field in the direction that intersects the vertical direction (also referred to as the horizontal direction or the diagonal direction) of the layer containing a liquid crystal material.

<<Layer 753 Containing Liquid Crystal Material>>

For example, thermotropic liquid crystal, low-molecular liquid crystal, high-molecular liquid crystal, polymer dispersed liquid crystal, ferroelectric liquid crystal, or antiferroelectric liquid crystal can be used for the layer 753 containing a liquid crystal material. Alternatively, a liquid crystal material that exhibits a cholesteric phase, a smectic phase, a cubic phase, a chiral nematic phase, an isotropic phase, or the like can be used. Alternatively, a liquid crystal material that exhibits a blue phase can be used.

<<First Electrode 751(i, j)>>

For example, the material that is used for the wiring or the like can be used for the first electrode 751(i, j). Specifically, a light-transmitting conductive material can be used for the first electrode 751(i, j).

<<Color Film CF>>

A material transmitting light of a predetermined color can be used for the color film CF. Thus, the color film CF can be used as a color filter, for example. For example, a material that transmits blue light, green light, or red light can be used for the color film CF. Furthermore, a material that transmits yellow light, white light, or the like can be used for the color film CF.

<<Light-Blocking Film BM>>

A material that prevents light transmission can be used for the light-blocking film BM. Thus, the light-blocking film BM can be used as a black matrix, for example.

<<Insulating Film 771>>

The insulating film 771 can be formed of, for example, polyimide, an epoxy resin, or an acrylic resin.

<<Functional Film 710P, Functional Film 770P>>

An anti-reflection film, a polarizing film, a retardation film, a light diffusion film, a light-condensing film, or the like can be used as the functional film 710P or the functional film 770P.

Alternatively, an antistatic film preventing the attachment of a foreign substance, a water repellent film suppressing the attachment of stain, a hard coat film suppressing generation of a scratch in use, or the like can be used for the functional film 770P.

<<Base 710, Base 770>>

A material having heat resistance high enough to withstand heat treatment in the manufacturing process can be used for the base 710 or 770 or the like. For example, a material with a thickness greater than or equal to 0.1 mm and less than or equal to 0.7 mm can be also used for the base 710 or the base 770. Specifically, a material polished to a thickness of approximately 0.1 mm can be used.

For example, a large-sized glass substrate having any of the following sizes can be used as the base 710 or 770 or the like: the 6th generation (1500 mm×1850 mm), the 7th generation (1870 mm×2200 mm), the 8th generation (2200 mm×2400 mm), the 9th generation (2400 mm×2800 mm), and the 10th generation (2950 mm×3400 mm). Thus, a large-sized display device can be manufactured.

For the base 710 or 770 or the like, an organic material, an inorganic material, a composite material of an organic material and an inorganic material, or the like can be used. For example, an inorganic material such as glass, ceramic, or metal can be used for the base 710 or 770 or the like.

Specifically, non-alkali glass, soda-lime glass, potash glass, crystal glass, aluminosilicate glass, tempered glass, chemically tempered glass, quartz, sapphire, or the like can be used for the base 710 or 770 or the like. Specifically, an inorganic oxide film, an inorganic nitride film, an inorganic oxynitride film, or the like can be used for the base 710 or 770 or the like. For example, a silicon oxide film, a silicon nitride film, a silicon oxynitride film, or an aluminum oxide film can be used for the base 710 or 770 or the like. For example, stainless steel or aluminum can be used for the base 710 or 770 or the like.

For example, a single-crystal semiconductor substrate or a polycrystalline semiconductor substrate made of silicon or silicon carbide, a compound semiconductor substrate made of silicon germanium or the like, or an SOI substrate can be used as the base 710 or 770 or the like. Thus, a semiconductor element can be provided over the base 710 or 770 or the like.

For example, an organic material such as a resin, a resin film, or plastic can be used for the base 710 or 770 or the like. Specifically, a resin film or resin plate of polyester, polyolefin, polyamide, polyimide, polycarbonate, an acrylic resin, or the like can be used for the base 710 or 770 or the like.

For example, a composite material formed by attaching a metal plate, a thin glass plate, or a film of an inorganic material to a resin film or the like can be used for the base 710 or 770 or the like. For example, a composite material formed by dispersing a fibrous or particulate metal, glass, an inorganic material, or the like into a resin film can be used for the base 710 or 770 or the like. For example, a composite material formed by dispersing a fibrous or particulate resin, an organic material, or the like into an inorganic material can be used for the base 710 or 770 or the like.

Furthermore, a single-layer material or a layered material in which a plurality of layers are stacked can be used for the base 710 or 770 or the like. For example, a layered material in which a base, an insulating film that prevents diffusion of impurities contained in the base, and the like are stacked can be used for the base 710 or 770 or the like. Specifically, a material obtained by stacking glass and one or a plurality of films that are selected from a silicon oxide layer, a silicon nitride layer, a silicon oxynitride layer, and the like and that prevent diffusion of impurities contained in the glass can be used for the base 710 or 770 or the like. Alternatively, a layered material in which a resin and a film for preventing diffusion of impurities that penetrate the resin, such as a silicon oxide film, a silicon nitride film, and a silicon oxynitride film are stacked can be used for the base 710 or 770 or the like.

Specifically, a resin film or resin plate of polyester, polyolefin, polyamide, polyimide, polycarbonate, an acrylic resin, a layered material including any of them, or the like can be used for the base 710 or 770 or the like.

Specifically, a material including polyester, polyolefin, polyamide (e.g., nylon or aramid), polyimide, polycarbonate, polyurethane, an acrylic resin, an epoxy resin, or a resin having a siloxane bond, such as silicone, can be used for the base 710 or 770 or the like.

Specifically, polyethylene terephthalate (PET), polyethylene naphthalate (PEN), polyethersulfone (PES), acrylic, or the like can be used for the base 710 or 770 or the like.

Alternatively, paper, wood, or the like can be used for the base 710 or 770 or the like.

For example, a flexible substrate can be used as the base 710 or 770 or the like.

Note that a transistor, a capacitor, or the like can be directly formed on the substrate. Alternatively, a method in which a transistor, a capacitor, or the like is formed over a substrate for use in manufacturing processes which can withstand heat applied in the manufacturing process and is transferred to the base 710 or 770 or the like can be employed. Thus, a transistor, a capacitor, or the like can be formed over a flexible substrate, for example.

<<Insulating Film 721>>

For example, an insulating inorganic material, an insulating organic material, or an insulating composite material containing an inorganic material and an organic material can be used for the insulating film 721 or the like.

Specifically, an inorganic oxide film, an inorganic nitride film, an inorganic oxynitride film, or the like or a material obtained by stacking any of these films can be used for the insulating film 721 or the like. For example, a film including a silicon oxide film, a silicon nitride film, a silicon oxynitride film, and an aluminum oxide film, and the like, or a film including a material obtained by stacking any of these films can be used for the insulating film 721 or the like.

Specifically, polyester, polyolefin, polyamide, polyimide, polycarbonate, polysiloxane, an acrylic resin, or a stacked or composite material including resins selected from these, or the like can be used for the insulating film 721 or the like. Alternatively, a photosensitive material may be used.

Thus, steps due to components overlapping with the insulating film 721, for example, can be covered so that a flat surface can be formed.

<<Insulating Film 701>>

For example, a material that can be used for the insulating film 721 can be used for the insulating film 701. Specifically, a material containing silicon and oxygen can be used for the insulating film 701. Thus, diffusion of impurities into the pixel circuit 730($i, j$) or the like can be suppressed.

<Structure Example 2 of Input/Output Device>

Another structure of the input/output device of one embodiment of the present invention is described with reference to FIG. 7.

FIG. 7 is a cross-sectional view illustrating a structure of a pixel 702($i, j$) B.

The pixel 702($i, j$) B is different from the pixel 702($i, j$) described with reference to FIGS. 6A and 6B in that the pixel 702($i, j$) B includes a signal line S(j)2B instead of the signal line S(j)2. Different structures are described in detail below, and the above description is referred to for the other similar structures.

For example, a film that can be formed in the same step as the control line C(g) can be used for the signal line S(j)2.

<Structure Example 3 of Input/Output Device>

Another structure of the input/output device of one embodiment of the present invention is described with reference to FIG. 8.

FIG. 8 is a cross-sectional view illustrating a structure of a pixel 702($i, j$) C.

The pixel 702($i, j$) C is different from the pixel 702($i, j$) described with reference to FIGS. 6A and 6B in that the pixel 702($i, j$) C includes a first electrode 751($i, j$) C and a control line C(g) C instead of the first electrode 751($i, j$) and the control line C(g), respectively.

<Structure Example 4 of Input/Output Device>

Another structure of an input/output device of one embodiment of the present invention is described with reference to FIG. 9.

FIG. 9 is a cross-sectional view illustrating a structure of a pixel 702($i, j$) D.

The pixel 702($i, j$) D is different from the pixel 702($i, j$) described with reference to FIGS. 6A and 6B in that the pixel 702($i, j$) D includes a signal line S(j) 2D, a first electrode 751($i, j$) D, and a control line C(g) D instead of the signal line S(j)2, the first electrode 751($i, j$), and the control line C(g), respectively.

<Structure Example 5 of Input/Output Device>

Another structure of the input/output device of one embodiment of the present invention is described with reference to FIG. 10.

Figure 10:
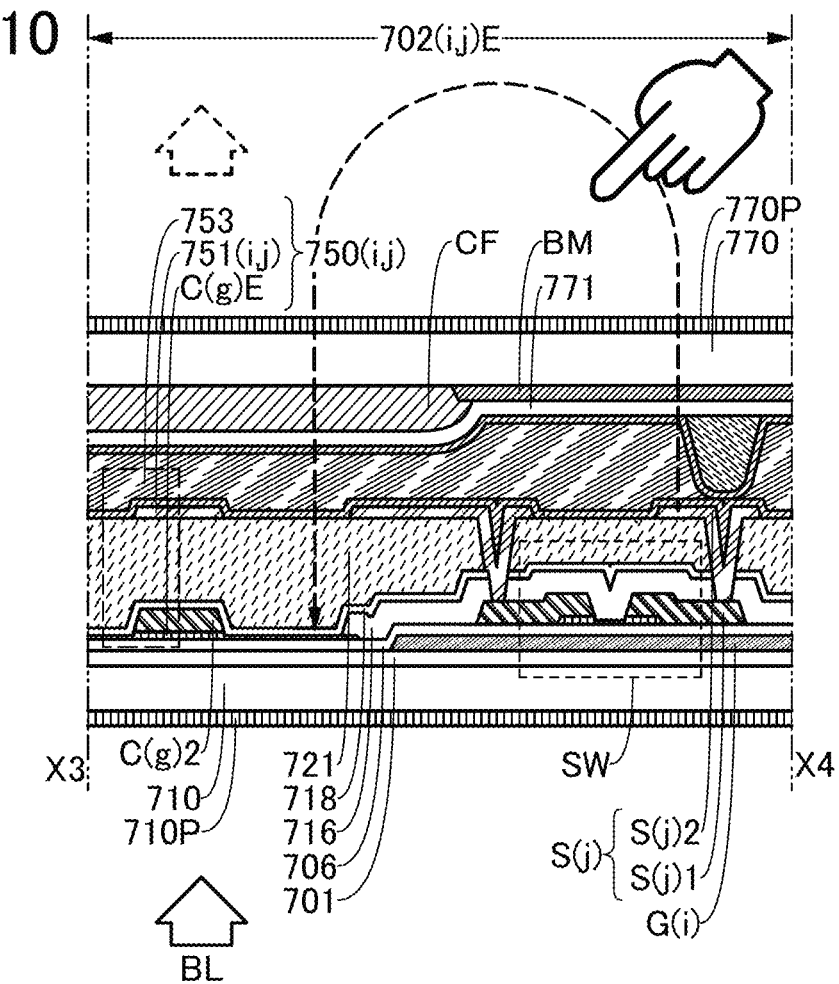
FIG. 10 is a top view illustrating a structure of a pixel that can be used in an input/output device of Embodiment.

FIG. 10 is a cross-sectional view illustrating a structure of a pixel 702($i, j$)E.

The pixel 702($i, j$)E is different from the pixel 702($i, j$) described with reference to FIGS. 6A and 6B in that the pixel 702($i, j$)E uses a conductive oxide semiconductor film for a control line C(g)E and includes an auxiliary wiring C(g)2 that compensates the conductivity of the control line C(g)E. Different structures are described in detail below, and the above description is referred to for the other similar structures.

For example, an oxide semiconductor film that can be formed in the same step as the semiconductor film of the transistor SW can be used for the control line C(g)E. Specifically, an oxide semiconductor film containing an In—Ga—Zn oxide can be used. For example, a silicon nitride film formed by a CVD method or the like can be used as the insulating film 718 in contact with the control line C(g)E. Thus, the control line C(g)E can have high conductivity.

For example, a conductive film that can be formed in the same step as the conductive film 712A, the conductive film 712B, or the like can be used for the auxiliary wiring C(g)2. In particular, the auxiliary wiring C(g)2 is disposed such that a region of the auxiliary wiring C(g)2 that overlaps with an opening of a pixel has a smaller area than a region of the auxiliary wiring C(g)2 that does not overlap with the opening of the pixel.

<Structure Example 6 of Input/Output Device>

Another structure of the input/output device of one embodiment of the present invention is described with reference to FIGS. 11A and 11B.

Figure 11A:
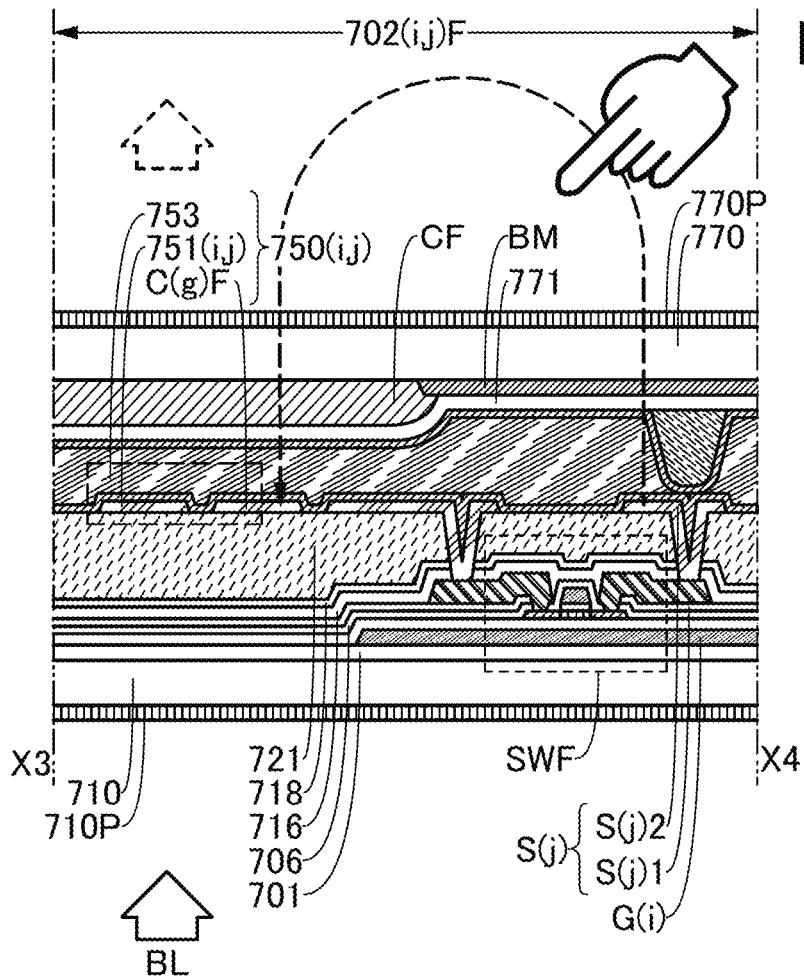
FIGS. 11A and 11B are cross-sectional views illustrating a structure of a pixel that can be used in an input/output device of Embodiment.
Figure 11B:
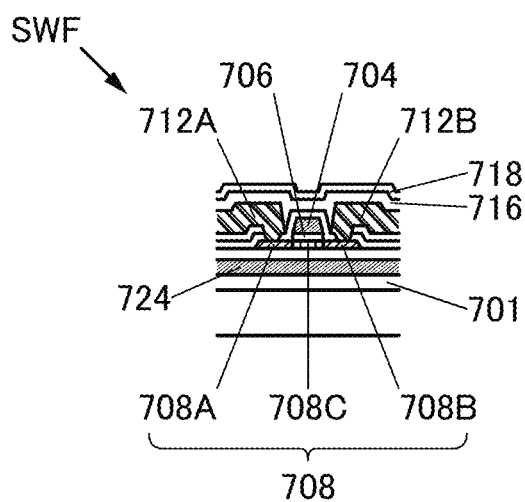

FIG. 11A is a cross-sectional view illustrating a structure of a pixel 702(i, j) F. FIG. 11B is a cross-sectional view illustrating part of FIG. 11A.

The pixel 702(i, j) F is different from the pixel 702(i, j) described with reference to FIGS. 6A and 6B in that the pixel 702(i, j) F includes a control line C(g) F and a top-gate transistor instead of the control line C(g) also functioning as the second electrode and the bottom-gate transistor, respectively. Different structures are described in detail below, and the above description is referred to for the other similar structures.

For example, a film that can be formed in the same step as the first electrode 751(i, j) can be used for the control line C(g) F.

<Structure Example 7 of Input/Output Device>

Another structure of the input/output device of one embodiment of the present invention is described with reference to FIGS. 12A and 12B.

Figure 12A:
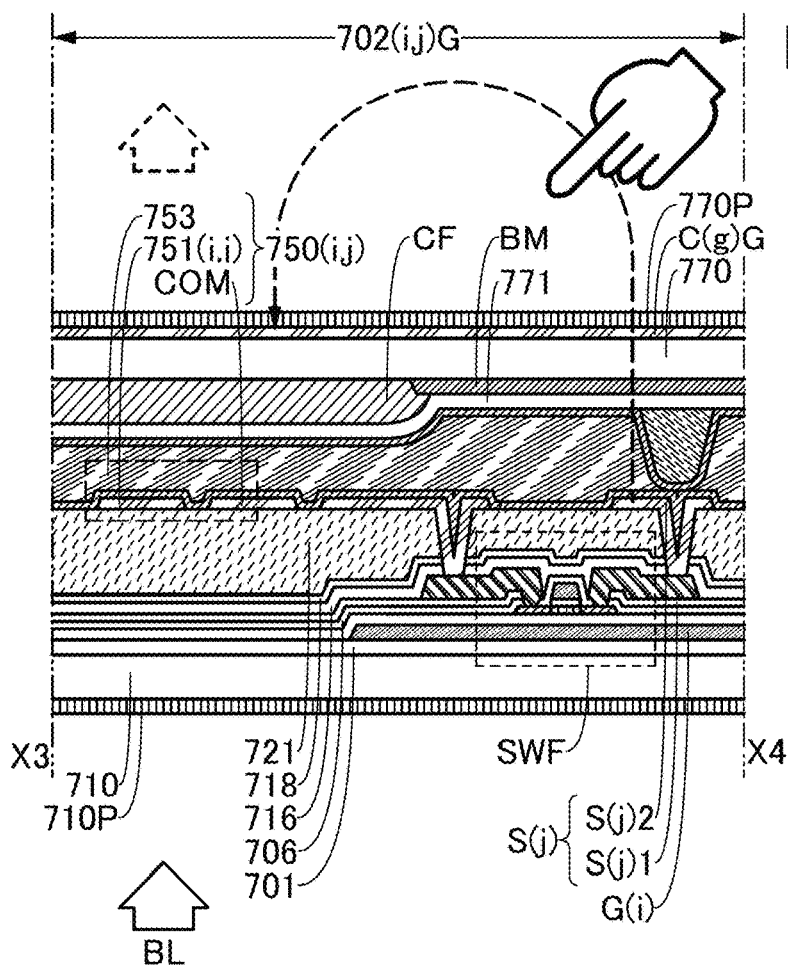
FIGS. 12A and 12B are a cross-sectional view and a circuit diagram illustrating a structure of a pixel that can be used in an input/output device of Embodiment.
Figure 12B:
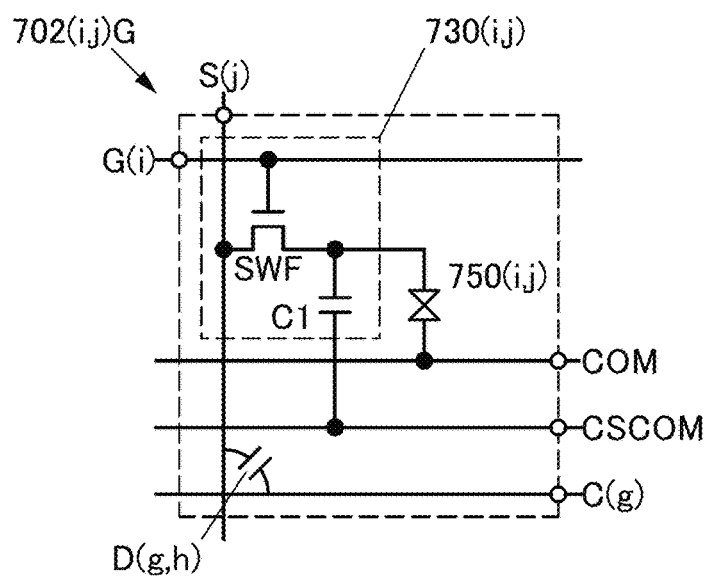

FIGS. 12A and 12B are respectively a cross-sectional view and a circuit diagram illustrating a structure of a pixel 702(i, j) G.

The pixel 702(i, j) G is different from the pixel 702(i, j) F described with reference to FIGS. 11A and 11B in that the pixel 702(i, j) G includes a second electrode COM and a control line C(g) G instead of the control line C(g) F also serving as the second electrode. Different structures are described in detail below, and the above description is referred to for the other similar structures.

For example, the control line C(g) G has a region by which and the layer 753 containing a liquid crystal material, the base 770 is sandwiched. Thus, the control line C(g) G can be disposed near an object approaching the input/output panel 700TP.

<Structure Example 8 of Input/Output Device>

Another structure of the input/output device of one embodiment of the present invention is described with reference to FIG. 13.

Figure 13:
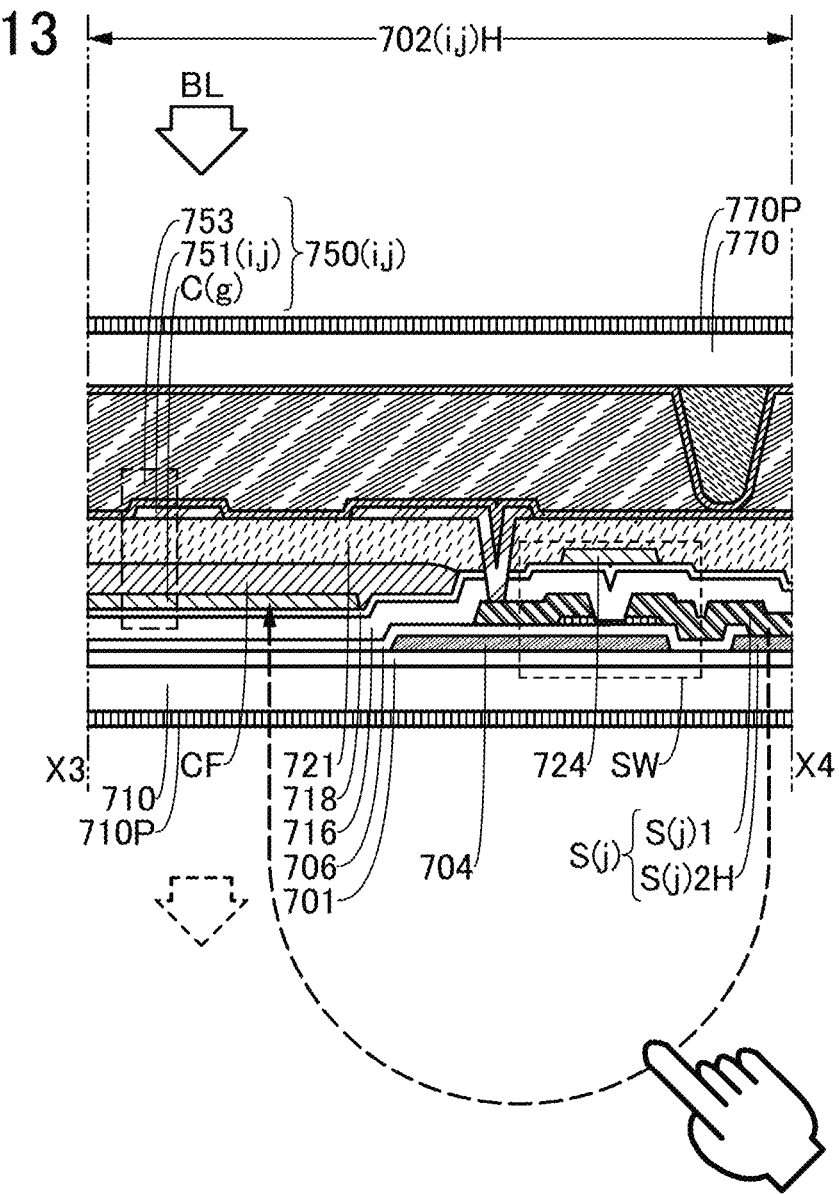
FIG. 13 is a cross-sectional view illustrating a structure of a pixel that can be used in an input/output device of Embodiment.

FIG. 13 is a cross-sectional view illustrating a structure of a pixel 702(i, j) H.

The pixel 702(i, j) H is different from the pixel 702(i, j) described with reference to FIGS. 6A and 6B in that light BL is emitted from a backlight on the base 770 side to the base 710 side and that the pixel 702(i, j) H includes a signal line S(j)2H between the signal line S(j)1 and the base 710, a color film CF between the insulating film 721 and the insulating film 718, and a conductive film 724 having a region by which and the conductive film 704, the semiconductor film is sandwiched. Thus, display is performed on the base 710 side. Moreover, an object approaching the base 710 side can be sensed. Note that the conductive film 724 can function as a second gate electrode. Different structures are described in detail below, and the above description is referred to for the other similar structures.

For example, a conductive film that can be formed in the same step as the scan line G(i) can be used for the signal line S(j)2H.

<Structure Example 9 of Input/Output Device>

Another structure of the input/output device of one embodiment of the present invention is described with reference to FIG. 14.

Figure 14:
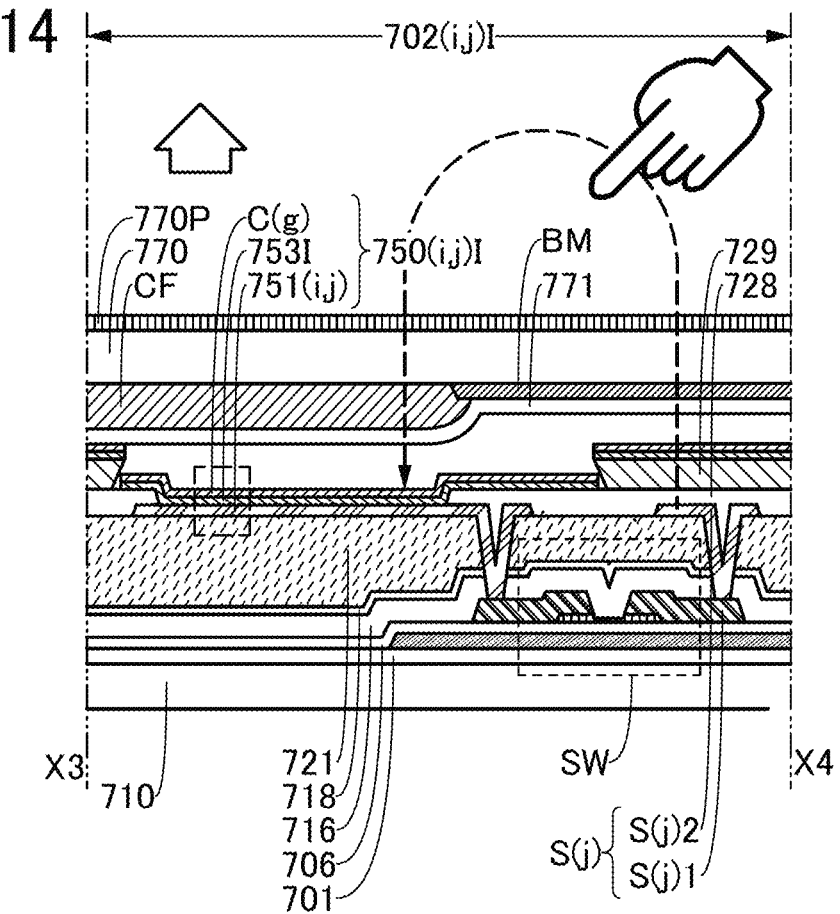
FIG. 14 is a cross-sectional view illustrating a structure of a pixel that can be used in an input/output device of Embodiment.

FIG. 14 is a cross-sectional view illustrating a structure of a pixel 702(i, j)I.

The pixel 702(i, j)I is different from the pixel 702(i, j) described with reference to FIGS. 6A and 6B in that the pixel 702(i, j)I includes a display element 750(i, j)I configured to emit light toward the base 770 side, an insulating film 728 having an opening in a region overlapping with the display element 750(i, j), and an insulating film 729 between the insulating film 728 and the base 770. Different structures are described in detail below, and the above description is referred to for the other similar structures.

For example, the display element 750(i, j)I can be an organic EL element. Specifically, an organic EL element that emits white light can be used as the display element 750(i, j).

The display element 750(i, j)I includes a layer 7531 containing a light-emitting material between the first electrode 751(i, j) and the control line C(g).

For example, a light-emitting organic material or a quantum dot can be used for the layer 7531 containing a light-emitting material.

For example, a material that can be used for the insulating film 721 can be used for the insulating film 728 or 729.

The insulating film 729 has a function of dividing the control line C(g) into a predetermined shape. For example, the insulating film 729 has a reversely-tapered end portion, and thus the control line C(g) with a predetermined shape can be formed by deposition for one conductive film. Specifically, the control line C(g) can be separated in a stripe pattern.

<Structure Example 10 of Input/Output Device>

Another structure of the input/output device of one embodiment of the present invention is described with reference to FIG. 15.

Figure 15:
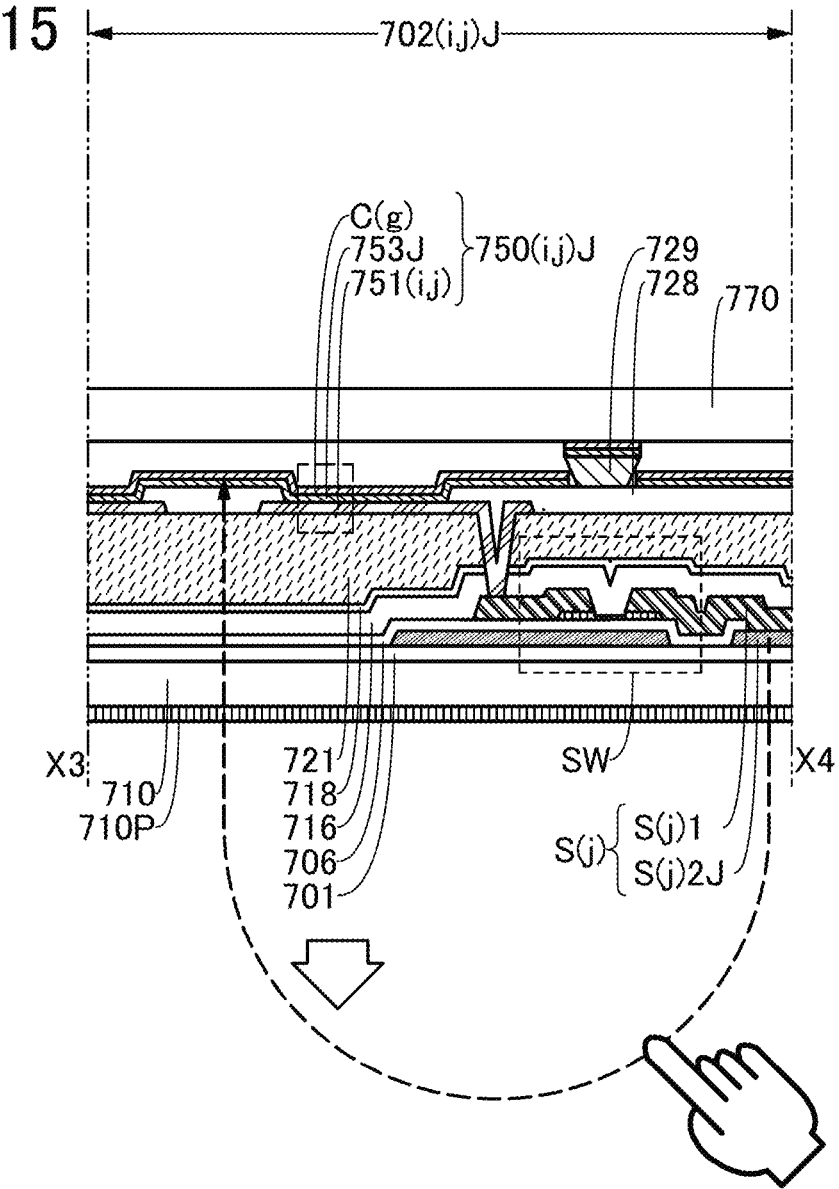
FIG. 15 is a cross-sectional view illustrating a structure of a pixel that can be used in an input/output device of Embodiment.

FIG. 15 is a cross-sectional view illustrating a structure of a pixel 702(i, j)J.

The pixel 702(i, j)J is different from the pixel 702(i, j) described with reference to FIGS. 6A and 6B in that the pixel 702(i, j)J includes a display element 750(i, j)J configured to emit light toward the base 710 side and a signal line S(j)2J having a region sandwiched by the signal line S(j)1 and the base 710. Thus, display is performed on the base 710 side. Moreover, an object approaching the base 710 side can be sensed.

For example, the display element 750(i, j)J can be an organic EL element. Specifically, an organic EL element that emits light, such as red light, green light, or blue light, can be used as the display element 750(i, j)J. Note that for example, by a shadow mask method or an ink-jet method, layers containing light-emitting materials emitting light of different colors can be formed over the same base.

The display element 750(i, j)J includes a layer 753J containing a light-emitting material between the first electrode 751(i, j) and the control line C(g).

Note that this embodiment can be combined with any of the other embodiments in this specification as appropriate.

Embodiment 2

In this embodiment, a method for driving the input/output panel of one embodiment of the present invention is described. FIGS. 16A1, 16A2, 16B1, and 16B2 schematically illustrate a method for driving the input/output device of one embodiment of the present invention.

FIGS. 16A1 and 16B1 schematically illustrate the input/output panel. FIGS. 16A2 and 16B2 schematically show a period for writing an image signal and a period for supplying a control signal to a sensor element.

<Example 1 of Method for Driving Input/Output Panel>

A method for driving the input/output device 700 described in this embodiment has the following four steps in one frame period of the display device.

<<First Step>>

In a first step, the switching signal S is supplied, and the driver circuit SD is electrically connected to the signal lines S(1) to S(n).

<<Second Step>>

In a second step, scan lines G(1) to G(m) are sequentially selected and supplied with an image signal. Note that a period during which the second step is performed can be called an image signal input period or a signal writing period.

For example, during a period T(V) that starts from time 0, the scan lines G(1) to G(m) are sequentially selected. A state in which the scan lines G(1) to G(m) are selected is schematically shown using straight lines LV (see FIG. 16A2). Thus, pixels in each row are selected and an image signal is input to pixels row by row. Note that during the period T(V), a predetermined potential, for example, a common potential, is supplied to control lines C(1) to C(p).

<<Third Step>>

In a third step, the switching signal S is supplied, and the sensor circuit DC is electrically connected to the signal lines S(1) to S(n).

<<Fourth Step>>

In a fourth step, the control lines C(1) to C(p) are sequentially selected and supplied with a control signal, and changes in potentials of the signal lines S(1) to S(n) are sensed using a sensor circuit SC. A sensor element supplied with the control signal forms an electric field between the control line C(g) and the signal line S(j). The electric field has a region shielded by the object approaching the input/output panel 700TP. The sensor circuit can sense the approaching object on the basis of the change in potential of the signal line S(j).

Note that a period during which the second step is performed can be called a sensing period or a signal reading period.

Thus, in a period during which scan lines are sequentially selected, the potentials of control lines can be kept constant. Furthermore, in a period during which control lines are sequentially selected, the potentials of scan lines can be kept constant. Moreover, an image signal can be written to a pixel regardless of a change in potential of a control line caused by selection. As a result, a novel method for driving an input/output panel that is highly convenient or reliable can be provided.

<Example 2 of Method for Driving Input/Output Panel>

Another method for driving the input/output device 700 described in this embodiment has the following five steps.

<<First Step>>

In a first step, the switching signal S is supplied, and the driver circuit SD is electrically connected to the signal lines S(1) to S(n).

<<Second Step>>

In a second step, scan lines each of which is electrically connected to a pixel that has a region overlapping with a control line that has not been selected in the one frame period are sequentially selected and supplied with an image signal. Note that a period during which the second step is performed can be called an image signal input period or a signal writing period.

For example, in a period T1(i), the scan lines G(i) to G(i+r) each electrically connected to a pixel that has a region overlapping with the control line C(g) that has not been selected in the one frame period are sequentially selected. Note that a state in which the scan lines G(i) to G(i+r) are selected is schematically shown using the straight lines LV (see FIG. 16B2). Thus, an image signal is input to pixels to be electrically connected to the scan lines G(i) to G(i+r) row by row. Note that in the period T1(i), a predetermined potential such as a common potential is supplied to the control line C(g).

<<Third Step>>

In a third step, the switching signal S is supplied, and the sensor circuit DC is electrically connected to the signal lines S(1) to S(n).

<<Fourth Step>>

In a fourth step, the control line C(g) is selected and supplied with a control signal, and changes in potentials of the signal lines S(1) to S(n) are sensed using a sensor circuit SC. Note that a state in which the control line C(g) is selected is schematically shown using straight lines LS.

<<Fifth Step>>

Next, the first to fourth steps are repeated such that all the scan lines and all the control lines are selected within the one frame period.

For example, scan lines each electrically connected to a pixel having a region overlapping with a control line C(g+1) adjacent to the selected control line C(g) are sequentially selected and supplied with an image signal; and then, the control line C(g+1) is selected and supplied with a control signal, and changes in potentials of the signal lines S(1) to S(n) are sensed using the sensor circuit SC.

Thus, an image signal can be written to a pixel regardless of a change in potential of a control line caused by selection. As a result, a novel method for driving an input/output panel that is highly convenient or reliable can be provided.

Note that this embodiment can be combined with any of the other embodiments in this specification as appropriate.

Embodiment 3

In this embodiment, a structure of a transistor that can be used in the input/output device of one embodiment of the present invention is described with reference to FIGS. 17A to 17C.

Figure 17A:
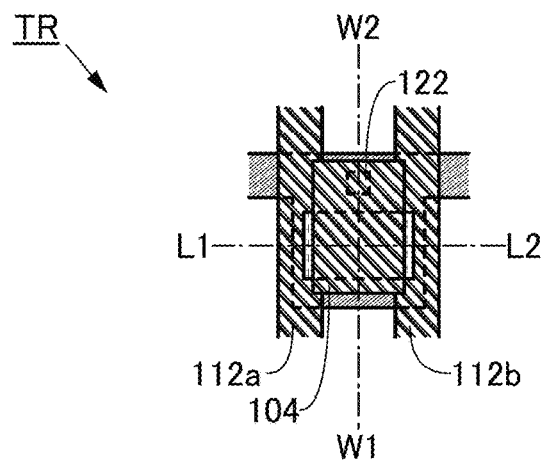
FIGS. 17A to 17C are a top view and cross-sectional views illustrating a semiconductor device.
Figure 17B:
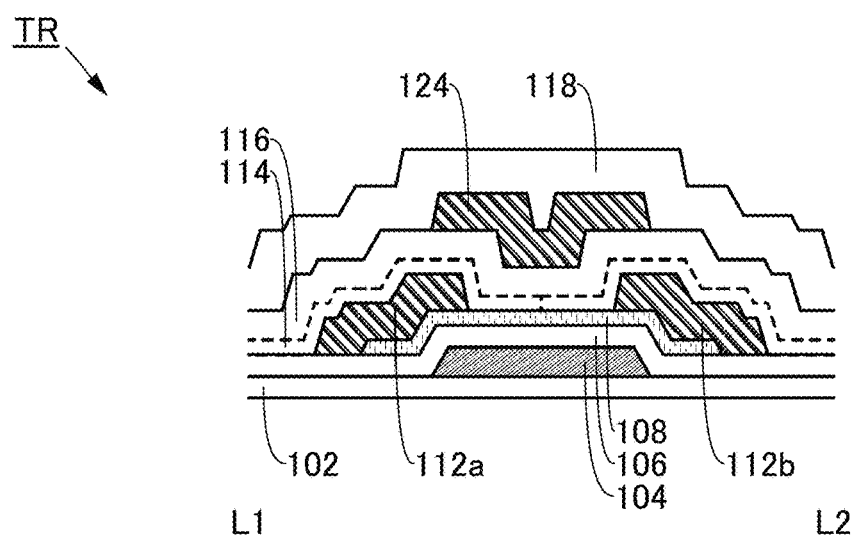
Figure 17C:
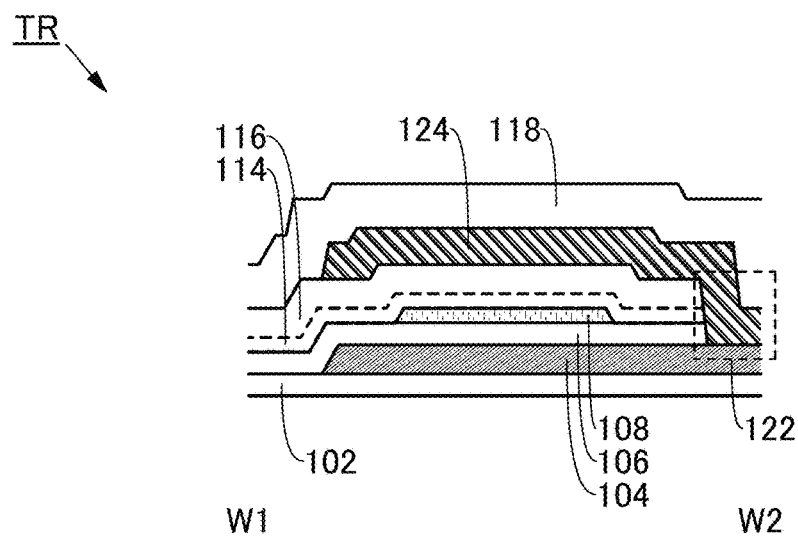

FIGS. 17A to 17C illustrate a structure of a transistor TR that can be used in the input/output device of one embodiment of the present invention. FIG. 17A is a top view illustrating the transistor TR that can be used in the input/output device of one embodiment of the present invention. FIG. 17B is a cross-sectional view illustrating the transistor of FIG. 17A in a channel length (L) direction. FIG. 17C is a cross-sectional view illustrating the transistor of FIG. 17A in a channel width (W) direction. In some cases, the direction of the line L1-L2 is referred to as a channel length direction and the direction of the line W1-W2 is referred to as a channel width direction.

Note that the transistor TR can be used in the input/output device or the like described in Embodiment 1.

For example, when the transistor TR is used as the transistor SW, an insulating film 102, a conductive film 104, an insulating film 106, a semiconductor film 108, a conductive film 112a, a conductive film 112b, a stacked film of an insulating film 114 and an insulating film 116, and an insulating film 118 can be referred to as the second insulating film 701, the conductive film 704, the insulating film 706, the semiconductor film 708, the conductive film 712A, the conductive film 712B, the insulating film 716, and the insulating film 718, respectively.

<Structure Example 1 of Transistor>

The transistor that can be used in the input/output device of one embodiment of the present invention includes the conductive film 104 over the second insulating film 102, the insulating film 106 over the second insulating film 102 and the conductive film 104, the semiconductor film 108 over the insulating film 106, the conductive film 112b over the semiconductor film 108, the conductive film 112a over the semiconductor film 108, the insulating film 114 over the semiconductor film 108, the conductive film 112a, and the conductive film 112b, the insulating film 116 over the insulating film 114, and a conductive film 124 over the insulating film 116 (see FIG. 17B).

For example, the conductive film 104 serves as the first gate electrode, the conductive film 112b serves as the source electrode, the conductive film 112a serves as the drain electrode, and the conductive film 124 serves as the second gate electrode. The insulating film 106 serves as a first gate insulating film and the insulating films 114 and 116 serve as second gate insulating films.

For example, an oxide semiconductor can be used for the semiconductor film 108. Specifically, an oxide semiconductor film containing indium or an oxide semiconductor film containing indium, gallium, and zinc can be used for the semiconductor film 108.

In addition, the semiconductor film 108 contains In, M (M is Al, Ga, Y, or Sn), and Zn.

The semiconductor film 108 preferably includes a region in which the atomic proportion of In is higher than that of M, for example. Note that the semiconductor device of one embodiment of the present invention is not limited to this. The semiconductor film 108 may include a region in which the atomic proportion of In is lower than that of M or may include a region in which the atomic proportion of In is equal to that of M.

The semiconductor film 108 preferably includes a region in which the atomic proportion of In is higher than that of M. Thus, the field effect mobility of the transistor can be increased. Specifically, the field-effect mobility of the transistor can exceed 10 cm$^2$/Vs, preferably exceed 30 cm$^2$/Vs.

<<Effect of Two Gate Electrodes>>

The transistor that can be used in the input/output device of one embodiment of the present invention can include two gate electrodes.

The effect of two gate electrodes on the characteristics of the transistor is described with reference to FIG. 17C.

As shown in FIG. 17C, the conductive film 124 serving as the second gate electrode is electrically connected to the conductive film 104 serving as the first gate electrode in an opening 122. Accordingly, the conductive film 104 and the conductive film 124 are supplied with the same potential.

As shown in FIG. 17C, the semiconductor film 108 is positioned so as to face the conductive film 104 and the conductive film 124, and is sandwiched between the two conductive films serving as the gate electrodes.

The length in the channel width direction of each of the conductive film 104 and the conductive film 124 is longer than that of the semiconductor film 108. Furthermore, the entire semiconductor film 108 is covered with the conductive film 104 and the conductive film 124 with the insulating films 106, 114, and 116 provided therebetween.

In other words, the conductive film 104 and the conductive film 124 are connected in the opening 122 provided in the insulating films 106, 114, and 116 and each include a region located outward from the side end portion of the semiconductor film 108.

With such a structure, the semiconductor film 108 included in the transistor can be electrically surrounded by electric fields of the conductive film 104 and the conductive film 124. A device structure of a transistor in which an oxide semiconductor film where a channel region is formed is electrically surrounded by electric fields of a first gate electrode and a second gate electrode can be referred to as a surrounded channel (S-channel) structure.

Since the transistor has the S-channel structure, an electric field for inducing a channel can be effectively applied to the semiconductor film 108 by the conductive film 104 functioning as the first gate electrode; therefore, the current drive capability of the transistor can be improved and high on-state current characteristics can be obtained. Since the on-state current can be increased, the size of the transistor can be reduced. In addition, since the transistor has a structure in which the semiconductor film 108 is surrounded by the conductive film 104 serving as the first gate electrode and the conductive film 124 serving as the second gate electrode, the mechanical strength of the transistor can be increased.

Although the structure in which the first gate electrode is electrically connected to the second gate electrode is described above, one embodiment of the present invention is not limited thereto. For example, the conductive film serving as the second gate electrode may be electrically connected to the conductive film 712B serving as the source electrode or the drain electrode of the transistor SW.

Note that this embodiment can be combined with any of the other embodiments in this specification as appropriate.

Embodiment 4

In this embodiment, structures of a transistor that can be used in the input/output device of one embodiment of the present invention are described with reference to FIGS. 18A and 18B and FIGS. 19A and 19B. Specifically, a structure of an oxide semiconductor film that can be used as a semiconductor film of a transistor is described below.

For example, the transistor described in this embodiment can be used as the transistor SW.

Figure 18A:
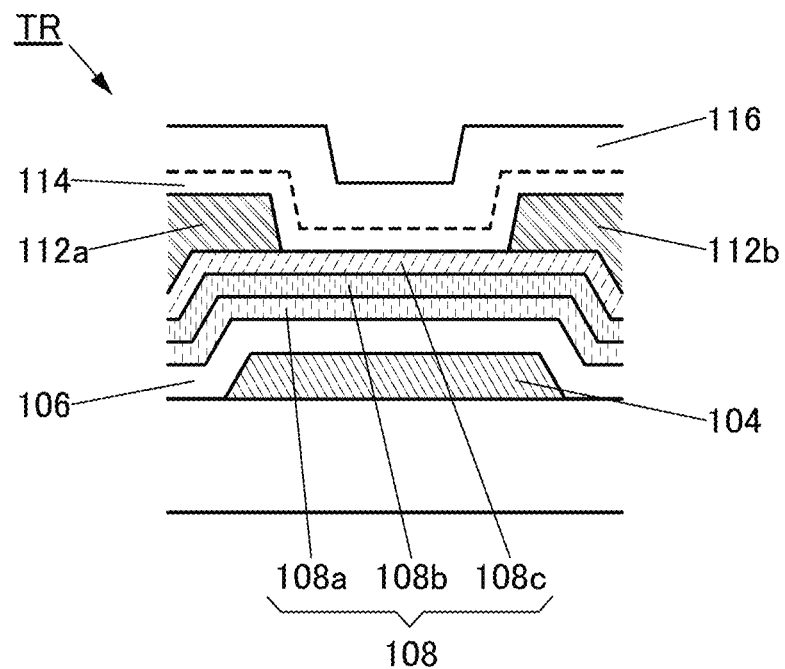
FIGS. 18A and 18B illustrate cross sections of a semiconductor film.
Figure 18B:
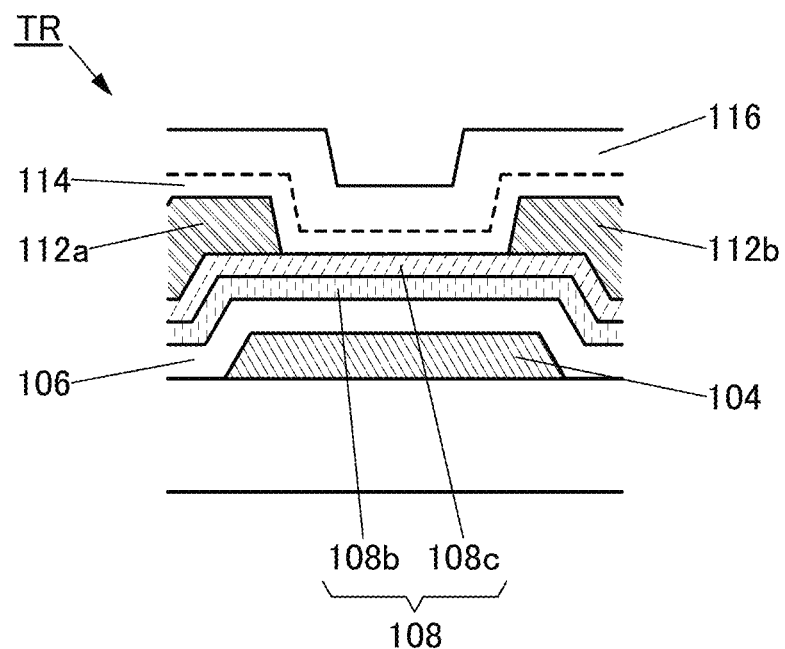

FIGS. 18A and 18B are cross-sectional views of the transistors in the channel length (L) direction. FIG. 18A is a cross-sectional view in the channel length (L) direction of a transistor including an oxide semiconductor film in which three films are stacked. FIG. 18B is a cross-sectional view in the channel length (L) direction of a transistor including an oxide semiconductor film in which two films are stacked.

Figure 19A:
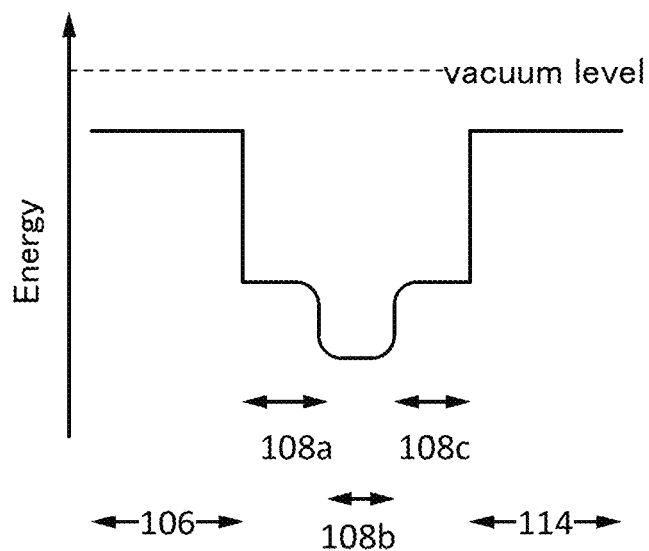
FIGS. 19A and 19B show energy bands.
Figure 19B:
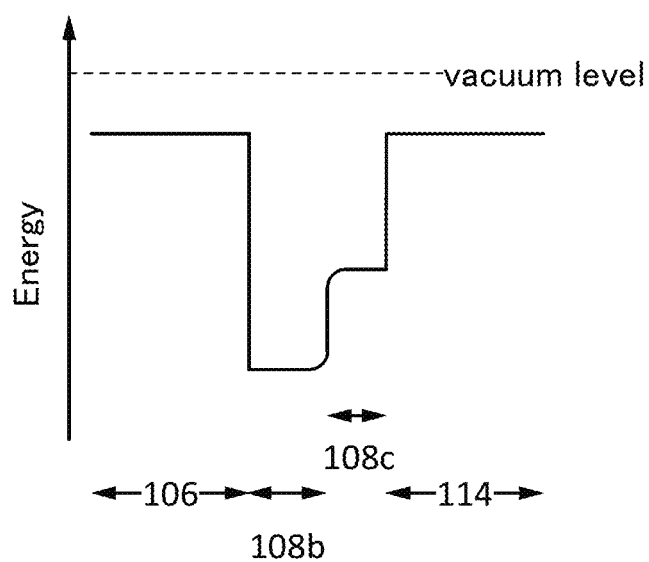

FIGS. 19A and 19B are schematic views each illustrating a band structure of stacked films. The stacked films include oxide semiconductor films and insulating films in contact with the oxide semiconductor film. For easy understanding, the band structure shows the energy level of the conduction band minimum ($E_c$) of each of the oxide semiconductor films and the insulating films included in the stacked films.

FIG. 19A illustrates an example of a band structure in the thickness direction of a stack including the insulating film 106, the semiconductor films 108a, 108b, and 108c, and the insulating film 114.

FIG. 19B illustrates an example of a band structure in the thickness direction of a stack including the insulating film 106, the semiconductor films 108b and 108c, and the insulating film 114.

<Structure Example 1 of Semiconductor Device>

For example, a semiconductor film that includes three films and is sandwiched between two insulating films can be used for the transistor. Specifically, a semiconductor film that includes the semiconductor films 108a, 108b, and 108c and are sandwiched between the insulating film 106 and the insulating film 116 can be used (see FIG. 18A and FIG. 19A).

The semiconductor film 108c includes a region overlapping with the semiconductor film 108a. The semiconductor film 108b includes a region sandwiched between the semiconductor film 108a and the semiconductor film 108c.

The insulating film 116 includes a region overlapping with the insulating film 106.

The semiconductor film 108a includes a region in contact with the insulating film 106, the semiconductor film 108c includes a region in contact with the insulating film 116, and the regions overlap with each other.

FIG. 19A is a band diagram of a structure in which a silicon oxide film is used as each of the insulating films 106 and 114, an oxide semiconductor film formed using a metal oxide target having an atomic ratio of metal elements of In:Ga:Zn=1:3:2 is used as the semiconductor film 108a, an oxide semiconductor film formed using a metal oxide target having an atomic ratio of metal elements of In:Ga:Zn=4:2:4.1 is used as the semiconductor film 108b, and an oxide semiconductor film formed using a metal oxide target having an atomic ratio of metal elements of In:Ga:Zn=1:3:2 is used as the semiconductor film 108c.

<Structure Example 2 of Semiconductor Device>

For example, a semiconductor film with a stacked structure of two films which is sandwiched between two insulating films can be used for the transistor. Specifically, an oxide semiconductor film in which the semiconductor film 108b and the semiconductor film 108c are stacked and which is sandwiched between the insulating film 106 and the insulating film 116 can be used for the transistor (see FIGS. 18B and 19B).

The semiconductor film 108c includes a region overlapping with the semiconductor film 108b.

The insulating film 116 includes a region overlapping with the insulating film 106.

The semiconductor film 108b includes a region in contact with the insulating film 106, the semiconductor film 108c includes a region in contact with the insulating film 116, and the regions overlap with each other.

FIG. 19B is a band diagram of a structure in which a silicon oxide film is used as each of the insulating films 106 and 114, an oxide semiconductor film formed using a metal oxide target having an atomic ratio of metal elements of In:Ga:Zn=4:2:4.1 is used as the semiconductor film 108b, and a metal oxide film formed using a metal oxide target having an atomic ratio of metal elements of In:Ga:Zn=1:3:2 is used as the semiconductor film 108c.

<Band Structure of Semiconductor Film>

As shown in FIGS. 19A and 19B, the energy level of the conduction band minimum gradually varies between the semiconductor film 108a and the semiconductor film 108b and between the semiconductor film 108b and the semiconductor film 108c. In other words, the energy level of the conduction band minimum is continuously varied or continuously connected. To obtain such a band structure, there exists no impurity, which forms a defect state such as a trap center or a recombination center, at the interface between the semiconductor film 108a and the semiconductor film 108b or at the interface between the semiconductor film 108b and the semiconductor film 108c.

To form a continuous junction between the semiconductor film 108a and the semiconductor film 108b and between the semiconductor film 108b and the semiconductor film 108c, the films need to be formed successively with a multi-chamber deposition apparatus (sputtering apparatus) provided with a load lock chamber, without being exposed to the atmosphere.

With the band structure of FIG. 19A or FIG. 19B, the semiconductor film 108b serves as a well, and a channel region is formed in the semiconductor film 108b in the transistor with the stacked-layer structure.

Note that by providing the semiconductor film 108a and/or the semiconductor film 108c, the semiconductor film 108b can be apart from trap states.

In addition, the trap states might be more distant from the vacuum level than the energy level of the conduction band minimum ($E_c$) of the semiconductor film 108b functioning as a channel region, so that electrons are likely to be accumulated in the trap states. When the electrons are accumulated in the trap states, the electrons become negative fixed electric charge, so that the threshold voltage of the transistor is shifted in the positive direction. Therefore, it is preferable that the trap states be closer to the vacuum level than the energy level of the conduction band minimum ($E_c$) of the semiconductor film 108b. Such a structure inhibits accumulation of electrons in the trap states. As a result, the on-state current and the field-effect mobility of the transistor can be increased.

The energy level of the conduction band minimum of each of the semiconductor films 108a and 108c is closer to the vacuum level than that of the semiconductor film 108b. Typically, a difference in energy level between the conduction band minimum of the semiconductor film 108b and the conduction band minimum of each of the semiconductor films 108a and 108c is 0.15 eV or more or 0.5 eV or more and 2 eV or less or 1 eV or less. That is, the difference between the electron affinity of each of the semiconductor films 108a and 108c and the electron affinity of the semiconductor film 108b is 0.15 eV or more or 0.5 eV or more and 2 eV or less or 1 eV or less.

In such a structure, the semiconductor film 108b serves as a main path of current and functions as a channel region. In addition, since the semiconductor films 108a and 108c each include one or more metal elements included in the semiconductor film 108b in which a channel region is formed, interface scattering is less likely to occur at the interface between the semiconductor film 108a and the semiconductor film 108b or at the interface between the semiconductor film 108b and the semiconductor film 108c. Thus, the transistor can have high field-effect mobility because the movement of carriers is not hindered at the interface.

To prevent each of the semiconductor films 108a and 108c from functioning as part of a channel region, a material having sufficiently low conductivity is used for the semiconductor films 108a and 108c. Alternatively, a material which has a smaller electron affinity (a difference in energy level between the vacuum level and the conduction band minimum) than the semiconductor film 108b and has a difference in energy level in the conduction band minimum from the semiconductor film 108b (band offset) is used for the semiconductor films 108a and 108c. Furthermore, to inhibit generation of a difference between threshold voltages due to the value of the drain voltage, it is preferable to form the semiconductor films 108a and 108c using a material whose energy level of the conduction band minimum is closer to the vacuum level than that of the semiconductor film 108b. For example, a difference in energy level between the conduction band minimum of the semiconductor film 108b and the conduction band minimum of the semiconductor films 108a and 108c is preferably 0.2 eV or more and further preferably 0.5 eV or more.

It is preferable that the semiconductor films 108a and 108c not have a spinel crystal structure. This is because if the semiconductor films 108a and 108c have a spinel crystal structure, constituent elements of the conductive films 112a and 112b might be diffused to the semiconductor film 108b at the interface between the spinel crystal structure and another region.

The thickness of each of the semiconductor films 108a and 108c is greater than or equal to a thickness that is capable of inhibiting diffusion of the constituent elements of the conductive films 112a and 112b to the semiconductor film 108b, and less than a thickness that inhibits supply of oxygen from the insulating film 114 to the semiconductor film 108b. For example, when the thickness of each of the semiconductor films 108a and 108c is greater than or equal to 10 nm, diffusion of the constituent elements of the conductive films 112a and 112b to the semiconductor film 108b can be inhibited. When the thickness of each of the semiconductor films 108a and 108c is less than or equal to 100 nm, oxygen can be effectively supplied from the insulating film 114 to the semiconductor film 108b.

When the semiconductor films 108a and 108c are each an In-M-Zn oxide in which the atomic proportion of M (M is Al, Ga, Y, or Sn) is higher than that of In, the energy gap of each of the semiconductor films 108a and 108c can be large and the electron affinity thereof can be small. Therefore, a difference in electron affinity between the oxide semiconductor film 108b and each of the oxide semiconductor films 108a and 108c may be controlled by the proportion of the element M. Furthermore, an oxygen vacancy is less likely to be generated in the oxide semiconductor film in which the atomic proportion of M is higher than that of In because M is a metal element that is strongly bonded to oxygen.

When an In-M-Zn oxide is used for the semiconductor films 108a and 108c, the proportions of In and M, not taking Zn and O into consideration, are preferably as follows: the atomic percentage of In is less than 50 atomic % and the atomic percentage of M is greater than 50 atomic %; and further preferably, the atomic percentage of In is less than 25 atomic % and the atomic percentage of M is greater than 75 atomic %. Alternatively, a gallium oxide film may be used as each of the semiconductor films 108a and 108c.

Furthermore, in the case where each of the semiconductor films 108a, 108b, and 108c is an In-M-Zn oxide, the proportion of M atoms in each of the semiconductor films 108a and 108c is higher than that in the semiconductor film 108b. Typically, the proportion of M atoms in each of the semiconductor films 108a and 108c is 1.5 or more times, preferably twice or more times, and further preferably three or more times that in the oxide semiconductor film 108b.

Furthermore, in the case where the semiconductor films 108a, 108b, and 108c are each an In-M-Zn oxide, when the semiconductor film 108b has an atomic ratio of In:M:Zn=$x_1$:$y_1$:$z_1$ and the semiconductor films 108a and 108c each have an atomic ratio of In:M:Zn=$x_2$:$y_2$:$z_2$, $y_2/x_2$ is larger than $y_1/x_1$, preferably $y_2/x_2$ is 1.5 or more times as large as $y_1/x_1$, further preferably $y_2/x_2$ is two or more times as large as $y_1/x_1$, and still further preferably $y_2/x_2$ is three or more times or four or more times as large as $y_1/x_1$. At this time, $y_1$ is preferably greater than or equal to $x_1$ in the semiconductor film 108b, because a transistor including the semiconductor film 108b can have stable electrical characteristics. However, when $y_1$ is three or more times as large as $x_1$, the field-effect mobility of the transistor including the semiconductor film 108b is reduced. Accordingly, $y_1$ is preferably smaller than three times $x_1$.

In the case where the semiconductor film 108b is an In-M-Zn oxide and a target having the atomic ratio of metal elements of In:M:Zn=$x_1$:$y_1$:$z_1$ is used for depositing the semiconductor film 108b, $x_1/y_1$ is preferably greater than or equal to ⅓ and less than or equal to 6 and further preferably greater than or equal to 1 and less than or equal to 6, and $z_1/y_1$ is preferably greater than or equal to ⅓ and less than or equal to 6 and further preferably greater than or equal to 1 and less than or equal to 6.

In the case where the semiconductor films 108a and 108c are each an In-M-Zn oxide and a target having an atomic ratio of metal elements of In:M:Zn=$x_2$:$y_2$:$z_2$ is used for depositing the semiconductor films 108a and 108c, $x_2/y_2$ is preferably less than $x_1/y_1$, and $z_2/y_2$ is preferably greater than or equal to ⅓ and less than or equal to 6 and further preferably greater than or equal to 1 and less than or equal to 6. When the atomic ratio of M with respect to In is high, the energy gap of the semiconductor films 108a and 108c can be large and the electron affinity thereof can be small; therefore, $y_2/x_2$ is preferably higher than or equal to 3 or higher than or equal to 4. Typical examples of the atomic ratio of the metal elements of the target include In:M:Zn=1:3:2, In:M:Zn=1:3:4, In:M:Zn=1:3:5, In:M:Zn=1:3:6, In:M:Zn=1:4:2, In:M:Zn=1:4:4, In:M:Zn=1:4:5, and In:M:Zn=1:5:5.

Furthermore, in the case where the semiconductor films 108a and 108c are each an In-M oxide, when a divalent metal element (e.g., zinc) is not included as M, the semiconductor films 108a and 108c which do not include a spinel crystal structure can be formed. As the semiconductor films 108a and 108c, for example, an In—Ga oxide film can be used. The In—Ga oxide can be formed by a sputtering method using an In—Ga metal oxide target (In:Ga=7:93), for example. To deposit the semiconductor films 108a and 108c by a sputtering method using DC discharge, on the assumption that an atomic ratio of In:M is x:y, y/(x+y) is preferably less than or equal to 0.96 and further preferably less than or equal to 0.95, for example, 0.93.

In each of the semiconductor films 108a, 108b, and 108c, the proportions of the atoms in the above atomic ratio vary within a range of +40% as an error.

This embodiment can be implemented in combination with any of the other embodiments in this specification as appropriate.

Embodiment 5

In this embodiment, electronic devices each of which includes the input/output device of one embodiment of the present invention are described with reference to FIGS. 20A to 20H.

FIGS. 20A to 20G illustrate electronic devices. These electronic devices can include a housing 5000, a display portion 5001, a speaker 5003, an LED lamp 5004, operation keys 5005 (including a power switch and an operation switch), a connection terminal 5006, a sensor 5007 (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared rays), a microphone 5008, and the like.

Figure 20A:
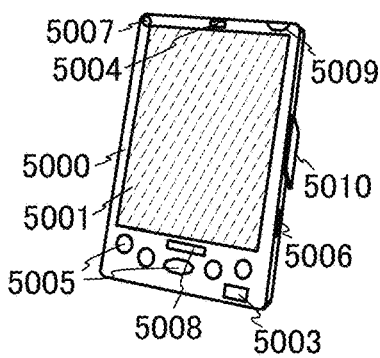
FIGS. 20A to 20H illustrate structures of electronic devices of Embodiment.
Figure 20B:
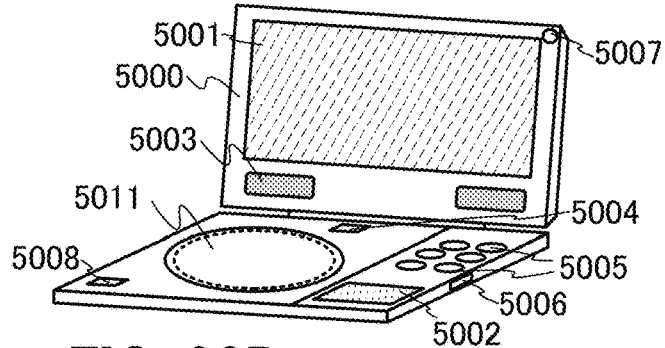
Figure 20C:
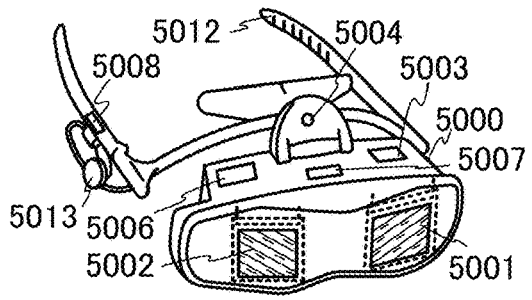
Figure 20D:
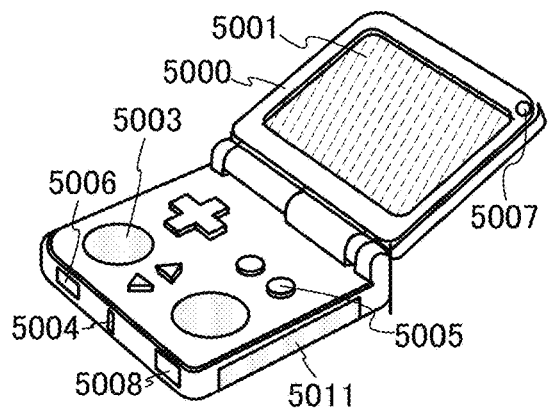
Figure 20E:
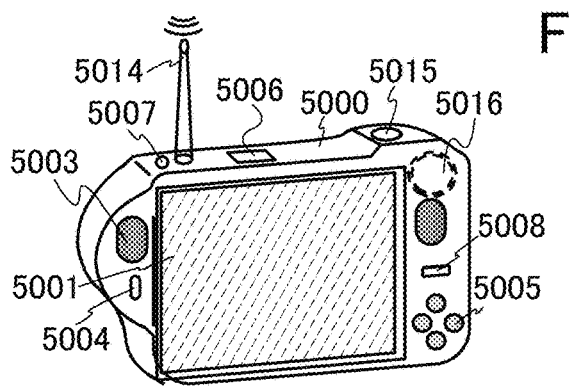
Figure 20F:
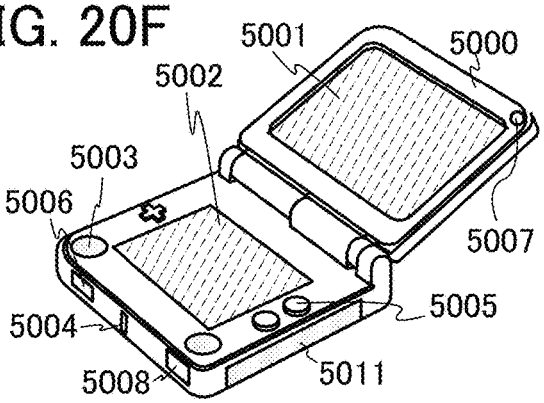
Figure 20G:
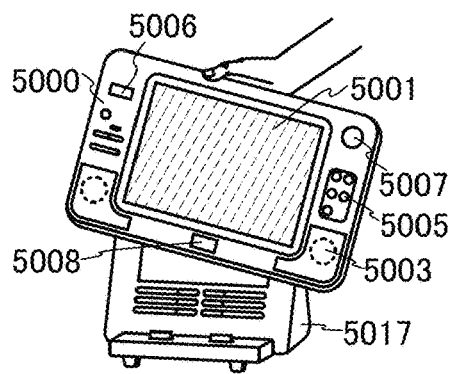

FIG. 20A illustrates a mobile computer that can include a switch 5009, an infrared port 5010, and the like in addition to the above components. FIG. 20B illustrates a portable image reproducing device (e.g., a DVD reproducing device) provided with a recording medium, and the portable image reproducing device can include a second display portion 5002, a recording medium reading portion 5011, and the like in addition to the above components. FIG. 20C illustrates a goggle-type display that can include the second display portion 5002, a support portion 5012, an earphone 5013, and the like in addition to the above components. FIG. 20D illustrates a portable game console that can include the recording medium reading portion 5011 and the like in addition to the above components. FIG. 20E illustrates a digital camera with a television reception function, and the digital camera can include an antenna 5014, a shutter button 5015, an image receiving portion 5016, and the like in addition to the above components. FIG. 20F illustrates a portable game console that can include the second display portion 5002, the recording medium reading portion 5011, and the like in addition to the above components. FIG. 20G illustrates a portable television receiver that can include a charger 5017 capable of transmitting and receiving signals, and the like in addition to the above components.

The electronic devices in FIGS. 20A to 20G can have a variety of functions such as a function of displaying a variety of data (e.g., a still image, a moving image, and a text image) on the display portion, a touch panel function, a function of displaying a calendar, date, time, and the like, a function of controlling processing with a variety of software (programs), a wireless communication function, a function of being connected to a variety of computer networks with a wireless communication function, a function of transmitting and receiving a variety of data with a wireless communication function, and a function of reading out a program or data stored in a recording medium and displaying it on the display portion. Furthermore, the electronic device including a plurality of display portions can have a function of displaying image data mainly on one display portion while displaying text data mainly on another display portion, a function of displaying a three-dimensional image by displaying images on a plurality of display portions with a parallax taken into account, or the like. Furthermore, the electronic device including an image receiving portion can have a function of shooting a still image, a function of taking moving images, a function of automatically or manually correcting a shot image, a function of storing a shot image in a recording medium (an external recording medium or a recording medium incorporated in the camera), a function of displaying a shot image on the display portion, or the like. Note that functions of the electronic devices in FIGS. 20A to 20G are not limited thereto, and the electronic devices can have a variety of functions.

Figure 20H:
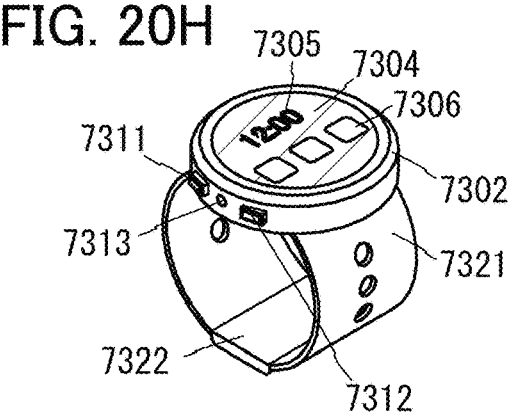

FIG. 20H illustrates a smart watch that includes a housing 7302, a display panel 7304, operation buttons 7311 and 7312, a connection terminal 7313, a band 7321, a clasp 7322, and the like.

The display panel 7304 mounted in the housing 7302 serving as a bezel includes a non-rectangular display region. The display panel 7304 may have a rectangular display region. The display panel 7304 can display an icon 7305 indicating time, another icon 7306, and the like.

The smart watch in FIG. 20H can have a variety of functions such as a function of displaying a variety of data (e.g., a still image, a moving image, and a text image) on the display portion, a touch panel function, a function of displaying a calendar, date, time, and the like, a function of controlling processing with a variety of software (programs), a wireless communication function, a function of being connected to a variety of computer networks with a wireless communication function, a function of transmitting and receiving a variety of data with a wireless communication function, and a function of reading out a program or data stored in a recording medium and displaying it on the display portion.

The housing 7302 can include a speaker, a sensor (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared rays), a microphone, and the like. Note that the smart watch can be manufactured using the light-emitting element for the display panel 7304.

This embodiment can be combined with any of the other embodiments in this specification as appropriate.

For example, in this specification and the like, an explicit description "X and Y are connected" means that X and Y are electrically connected, X and Y are functionally connected, and X and Y are directly connected. Accordingly, without being limited to a predetermined connection relationship, for example, a connection relationship shown in drawings or texts, another connection relationship is included in the drawings or the texts.

Here, X and Y each denote an object (e.g., a device, an element, a circuit, a wiring, an electrode, a terminal, a conductive film, or a layer).

Examples of the case where X and Y are directly connected include the case where an element that allows an electrical connection between X and Y (e.g., a switch, a transistor, a capacitor, an inductor, a resistor, a diode, a display element, a light-emitting element, or a load) is not connected between X and Y, and the case where X and Y are connected without the element that allows the electrical connection between X and Y provided therebetween.

For example, in the case where X and Y are electrically connected, one or more elements that enable an electrical connection between X and Y (e.g., a switch, a transistor, a capacitor, an inductor, a resistor, a diode, a display element, a light-emitting element, or a load) can be connected between X and Y. Note that the switch is controlled to be turned on or off. That is, the switch is conducting or not conducting (is turned on or off) to determine whether current flows therethrough or not. Alternatively, the switch has a function of selecting and changing a current path. Note that the case where X and Y are electrically connected includes the case where X and Y are directly connected.

For example, in the case where X and Y are functionally connected, one or more circuits that enable a functional connection between X and Y (e.g., a logic circuit such as an inverter, a NAND circuit, or a NOR circuit; a signal converter circuit such as a D/A converter circuit, an A/D converter circuit, or a gamma correction circuit; a potential level converter circuit such as a power supply circuit (e.g., a step-up circuit or a step-down circuit) or a level shifter circuit for changing the potential level of a signal; a voltage source; a current source; a switching circuit; an amplifier circuit such as a circuit that can increase signal amplitude, the amount of current, or the like, an operational amplifier, a differential amplifier circuit, a source follower circuit, and a buffer circuit; a signal generation circuit; a memory circuit; or a control circuit) can be connected between X and Y. For example, even when another circuit is interposed between X and Y, X and Y are functionally connected if a signal output from X is transmitted to Y. Note that the case where X and Y are functionally connected includes the case where X and Y are directly connected and the case where X and Y are electrically connected.

Note that in this specification and the like, an explicit description "X and Y are electrically connected" means that X and Y are electrically connected (i.e., the case where X and Y are connected with another element or another circuit provided therebetween), X and Y are functionally connected (i.e., the case where X and Y are functionally connected with another circuit provided therebetween), and X and Y are directly connected (i.e., the case where X and Y are connected without another element or another circuit provided therebetween). That is, in this specification and the like, the explicit description "X and Y are electrically connected" is the same as the description "X and Y are connected".

For example, any of the following expressions can be used for the case where a source (or a first terminal or the like) of a transistor is electrically connected to X through (or not through) Z1 and a drain (or a second terminal or the like) of the transistor is electrically connected to Y through (or not through) Z2, or the case where a source (or a first terminal or the like) of a transistor is directly connected to one part of Z1 and another part of Z1 is directly connected to X while a drain (or a second terminal or the like) of the transistor is directly connected to one part of Z2 and another part of Z2 is directly connected to Y.

Examples of the expressions include, "X, Y, a source (or a first terminal or the like) of a transistor, and a drain (or a second terminal or the like) of the transistor are electrically connected to each other, and X, the source (or the first terminal or the like) of the transistor, the drain (or the second terminal or the like) of the transistor, and Y are electrically connected to each other in this order", "a source (or a first terminal or the like) of a transistor is electrically connected to X, a drain (or a second terminal or the like) of the transistor is electrically connected to Y, and X, the source (or the first terminal or the like) of the transistor, the drain (or the second terminal or the like) of the transistor, and Y are electrically connected to each other in this order", and "X is electrically connected to Y through a source (or a first terminal or the like) and a drain (or a second terminal or the like) of a transistor, and X, the source (or the first terminal or the like) of the transistor, the drain (or the second terminal or the like) of the transistor, and Y are provided to be connected in this order". When the connection order in a circuit structure is defined by an expression similar to the above examples, a source (or a first terminal or the like) and a drain (or a second terminal or the like) of a transistor can be distinguished from each other to specify the technical scope.

Other examples of the expressions include, "a source (or a first terminal or the like) of a transistor is electrically connected to X through at least a first connection path, the first connection path does not include a second connection path, the second connection path is a path between the source (or the first terminal or the like) of the transistor and a drain (or a second terminal or the like) of the transistor, Z1 is on the first connection path, the drain (or the second terminal or the like) of the transistor is electrically connected to Y through at least a third connection path, the third connection path does not include the second connection path, and Z2 is on the third connection path" and "a source (or a first terminal or the like) of a transistor is electrically connected to X at least with a first connection path through Z1, the first connection path does not include a second connection path, the second connection path includes a connection path through which the transistor is provided, a drain (or a second terminal or the like) of the transistor is electrically connected to Y at least with a third connection path through Z2, and the third connection path does not include the second connection path". Still another example of the expression is "a source (or a first terminal or the like) of a transistor is electrically connected to X through at least Z1 on a first electrical path, the first electrical path does not include a second electrical path, the second electrical path is an electrical path from the source (or the first terminal or the like) of the transistor to a drain (or a second terminal or the like) of the transistor, the drain (or the second terminal or the like) of the transistor is electrically connected to Y through at least Z2 on a third electrical path, the third electrical path does not include a fourth electrical path, and the fourth electrical path is an electrical path from the drain (or the second terminal or the like) of the transistor to the source (or the first terminal or the like) of the transistor". When the connection path in a circuit structure is defined by an expression similar to the above examples, a source (or a first terminal or the like) and a drain (or a second terminal or the like) of a transistor can be distinguished from each other to specify the technical scope.

Note that these expressions are examples and there is no limitation on the expressions. Here, X, Y, Z1, and Z2 each denote an object (e.g., a device, an element, a circuit, a wiring, an electrode, a terminal, a conductive film, and a layer).

Even when independent components are electrically connected to each other in a circuit diagram, one component has functions of a plurality of components in some cases. For example, when part of a wiring also functions as an electrode, one conductive film functions as the wiring and the electrode. Thus, "electrical connection" in this specification includes in its category such a case where one conductive film has functions of a plurality of components.

This application is based on Japanese Patent Application serial no. 2016-047788 filed with Japan Patent Office on Mar. 11, 2016, the entire contents of which are hereby incorporated by reference.

What is claimed is:

1. A display device comprising:
   a scan line;
   a first insulating film over the scan line;
   an oxide semiconductor film over the first insulating film;
   a second insulating film over the oxide semiconductor film;
   a control line over the second insulating film;
   a third insulating film over the control line;
   a signal line electrically connected to the oxide semiconductor film, over and in contact with the third insulating film; and
   a first electrode of a display element over and in contact with the third insulating film,
   wherein the control line overlaps the signal line and the first electrode of the display element, and
   wherein the first electrode of the display element has a comb-shape.

2. The display device according to claim 1, wherein the control line is a second electrode of the display element.

3. The display device according to claim 1, wherein a rectangular wave, a sawtooth wave, or a triangular wave is applied to the control line.

4. The display device according to claim 1, wherein each of the oxide semiconductor film and the control line includes indium, gallium, and zinc.

5. The display device according to claim 1, wherein the control line overlaps an entire region of the comb-shape.

6. A display device comprising:
a scan line;
a first insulating film over the scan line;
an oxide semiconductor film over the first insulating film;
a second insulating film over the oxide semiconductor film;
a control line over the second insulating film;
a third insulating film over the control line;
a signal line electrically connected to the oxide semiconductor film, over and in contact with the third insulating film; and
a first electrode of a display element over and in contact with the third insulating film,
wherein the control line overlaps the signal line and the first electrode of the display element,
wherein the first electrode of the display element has a comb-shape, and
wherein the control line does not overlap the scan line.

7. The display device according to claim 6, wherein the control line is a second electrode of the display element.

8. The display device according to claim 6, wherein a rectangular wave, a sawtooth wave, or a triangular wave is applied to the control line.

9. The display device according to claim 6, wherein each of the oxide semiconductor film and the control line includes indium, gallium, and zinc.

10. The display device according to claim 6, wherein the control line overlaps an entire region of the comb-shape.

* * * * *